United States Patent
Chang et al.

(10) Patent No.: US 10,160,076 B2
(45) Date of Patent: Dec. 25, 2018

(54) EDGE STABILIZING SYSTEM AND METHOD FOR COMPOSITE BARREL SEGMENTS

(71) Applicant: The Boeing Company, Seal Beach Blvd., CA (US)

(72) Inventors: Li C Chang, Mount Pleasant, SC (US); Richard M Coleman, Renton, WA (US); Ronald J Steckman, North Charleston, SC (US); Andrew M Huckey, Mount Pleasant, SC (US); Nicholas A Norman, Summerville, SC (US)

(73) Assignee: THE BOEING COMPANY, Chicago, IL (US)

( * ) Notice: Subject to any disclaimer, the term of this patent is extended or adjusted under 35 U.S.C. 154(b) by 1175 days.

(21) Appl. No.: 13/722,526

(22) Filed: Dec. 20, 2012

(65) Prior Publication Data

US 2014/0077434 A1 Mar. 20, 2014

Related U.S. Application Data

(63) Continuation-in-part of application No. 13/622,035, filed on Sep. 18, 2012, now Pat. No. 8,789,837.

(51) Int. Cl.
*B23Q 3/00* (2006.01)
*B64F 5/10* (2017.01)
*B64F 5/50* (2017.01)

(52) U.S. Cl.
CPC .............. *B23Q 3/00* (2013.01); *B64F 5/10* (2017.01); *B64F 5/50* (2017.01); *Y10T 29/49998* (2015.01)

(58) Field of Classification Search
CPC ......... B23Q 3/00; B23Q 3/103; B64F 5/0009; B64F 5/0036; Y10T 29/49998;
(Continued)

(56) References Cited

U.S. PATENT DOCUMENTS 2,391,510 A 12/1945 Pioch et al.
2,649,632 A * 8/1953 Kessler ................... F16L 23/06
24/270

(Continued)

FOREIGN PATENT DOCUMENTS

EP 2284076 2/2011

OTHER PUBLICATIONS

International Searching Authority, Invitation to Pay Additional Fees and Partial Search Report for PCT/US2013/051991 dated Dec. 12, 2013, Dec. 12, 2013.

(Continued)

*Primary Examiner* — David Bryant
*Assistant Examiner* — Nirvana Deonauth
(74) *Attorney, Agent, or Firm* — Parsons Behle & Latimer

(57) ABSTRACT

An edge stabilizer for a composite structure includes an elongate edge support segment, defining a geometric shape of an edge of the composite structure, and a connector, configured to attach the edge support segment to the edge of the composite structure. The edge support segment comprises first and second halves configured to attach together around the edge, each half including a shoulder, opposing mating relationship of the shoulders defining a slot for receiving the edge. The edge stabilizer can be part of a system for stabilizing an edge of a composite barrel section. The system can also include a moveable cart, the barrel section being supportable upon the cart.

26 Claims, 16 Drawing Sheets

(58) Field of Classification Search
CPC .... Y10T 29/53961; B25B 11/02; B23P 19/04; B23K 37/0443
USPC .................................. 29/281.1; 269/37, 291
See application file for complete search history.

(56) References Cited

U.S. PATENT DOCUMENTS

| | | | | |
|---|---|---|---|---|
| 3,017,754 | A * | 1/1962 | Manne | A44C 9/02 29/441.1 |
| 3,194,525 | A | 7/1965 | Webb | |
| 4,082,094 | A * | 4/1978 | Dailey | A61M 39/1011 128/DIG. 26 |
| 4,440,265 | A | 4/1984 | Spagnoli | |
| 4,461,455 | A | 7/1984 | Mills et al. | |
| 4,619,545 | A * | 10/1986 | Kuttenbaum | F16B 2/065 403/169 |
| 5,088,682 | A * | 2/1992 | Gibbs | B25B 1/2494 248/231.41 |
| 5,645,389 | A | 7/1997 | Lilja et al. | |
| 5,722,512 | A | 3/1998 | Lilja et al. | |
| 5,816,367 | A | 10/1998 | Lilja et al. | |
| 6,000,903 | A | 12/1999 | Hatch et al. | |
| 6,170,141 | B1 * | 1/2001 | Rossway | B64F 5/0036 206/319 |
| 6,231,038 | B1 * | 5/2001 | Keyser | H01L 21/68721 269/100 |
| 6,298,536 | B1 | 10/2001 | Rossway et al. | |
| 6,334,746 | B1 | 1/2002 | Nguyen et al. | |
| 7,596,843 | B2 * | 10/2009 | Spishak | B64F 5/0009 269/28 |
| 7,624,488 | B2 | 12/2009 | Lum et al. | |
| 7,770,292 | B2 | 8/2010 | Stretton | |
| 8,342,495 | B2 * | 1/2013 | Weissenborn | A63C 11/26 269/101 |
| 8,789,837 | B2 | 7/2014 | Chang et al. | |
| 2003/0025261 | A1 * | 2/2003 | Anton | B25B 5/145 269/126 |
| 2006/0118235 | A1 * | 6/2006 | Lum | B25B 5/14 156/285 |
| 2008/0232899 | A1 * | 9/2008 | Berg | F16B 2/10 403/359.6 |
| 2010/0192346 | A1 * | 8/2010 | Simmons | B23K 31/12 29/281.1 |
| 2012/0102698 | A1 * | 5/2012 | Scott | B25B 27/0028 29/235 |
| 2012/0305725 | A1 * | 12/2012 | Dackow | F16G 11/00 248/231.81 |
| 2013/0122133 | A1 * | 5/2013 | Holmes | B29C 47/0011 425/381.2 |

OTHER PUBLICATIONS

US Patent and Trademark Office; Office Action; U.S. Appl. No. 14/294,794 dated Jun. 2, 2017.

* cited by examiner

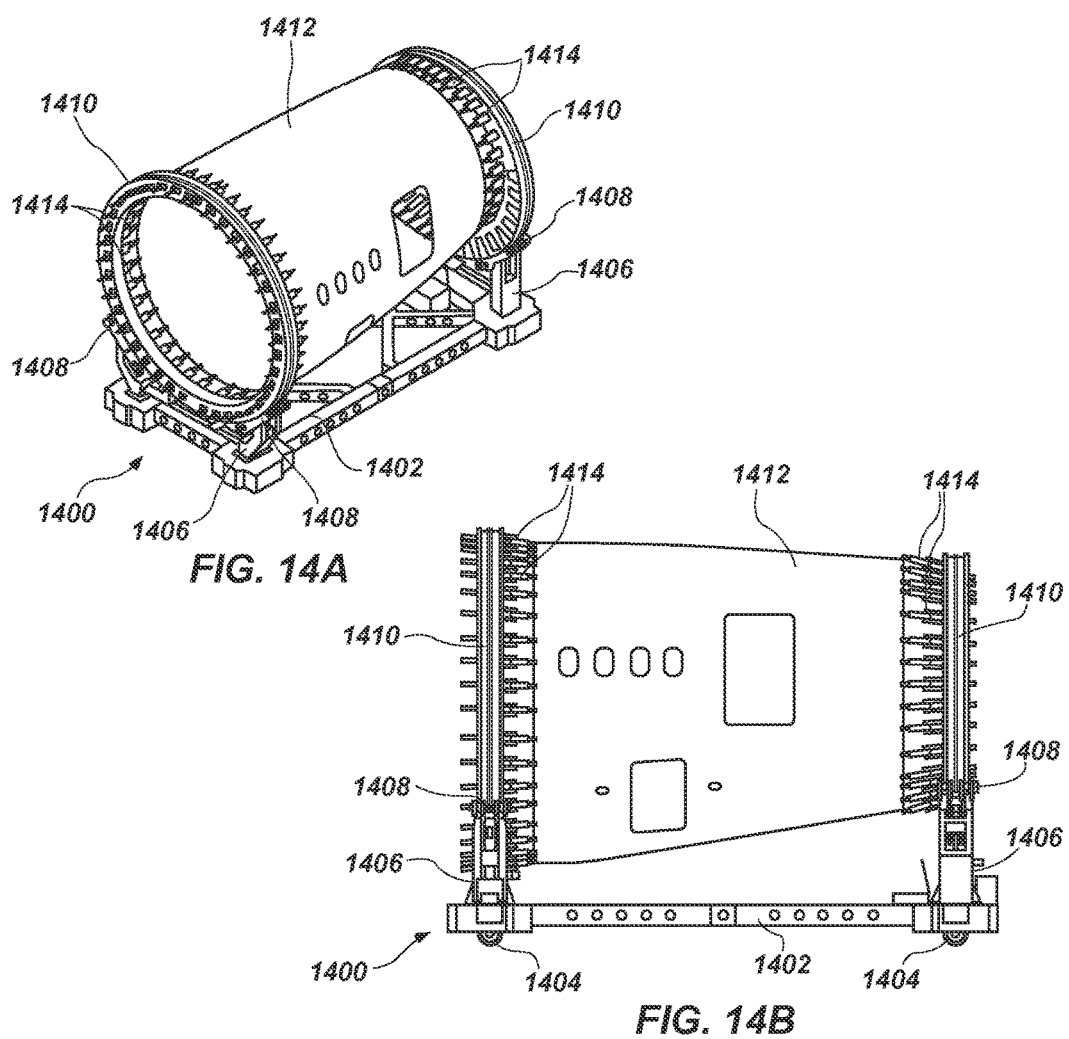
FIG. 14A
FIG. 14B
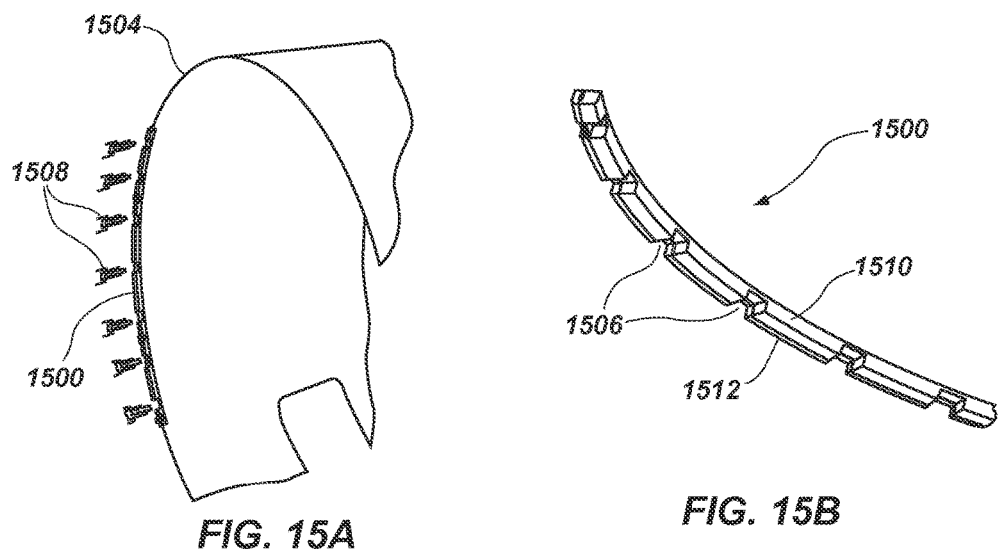
FIG. 15A
FIG. 15B

EDGE STABILIZING SYSTEM AND METHOD FOR COMPOSITE BARREL SEGMENTS

PRIORITY CLAIM

The present application is a continuation-in-part of U.S. patent application Ser. No. 13/622,035, filed on Sep. 18, 2012 and entitled TRANSPORT AND ASSEMBLY SYSTEM AND METHOD FOR COMPOSITE BARREL SEGMENTS, the disclosure of which is incorporated herein by reference in its entirety.

BACKGROUND

Field of the Invention

The present invention relates generally to the support of composite barrel segments during manufacture and assembly. More particularly, the present invention relates to a system and method for supporting and stabilizing the edges of composite barrel segments, such as aircraft fuselage segments, during the assembly process.

Related Art

In recent years, aircraft manufacturers have developed aircraft designs and aircraft fabrication methods that make greater use of carbon fiber composite materials and the like ("composite materials" or "CFCM"), such as graphite/epoxy and carbon fiber reinforced plastic ("CFRP"). Composite materials are significantly lighter than traditional aircraft materials (e.g. aluminum, titanium, steel and alloys of these), and can provide high strength with low weight, allowing lighter, more fuel efficient aircraft. In some newer aircraft, for example, the majority of the primary structure, including the fuselage and wing, is made of composite materials. By volume, some new aircraft can be about 80% composite materials.

Since composite materials have different characteristics than some traditional aircraft materials, new facilities, equipment and handling methods have been developed. For example, whereas traditional aircraft manufacturing involves attaching fuselage skin sections (e.g. aluminum sheets) to a metal aircraft frame, large barrel-shaped fuselage sections of composite material can be built as a single unit on an inner mold line mandrel. Such fuselage sections can be quite large, and are typically fabricated without an internal frame. After curing of the composite material, the inner mandrel is removed, and the fuselage section can be assembled with other fuselage sections.

Since structures fabricated from composite materials have different characteristics than many traditional aircraft materials, new equipment and methods have been developed for carrying and holding such structures after removal from a mandrel. One challenge presented by devices for holding and transporting large, frameless composite barrel sections after removal from a mandrel is controlling the shape of the barrel within geometric tolerances during subsequent manufacturing operations or during storage. This challenge relates particularly to the ends of such composite barrel segments.

The present application seeks to address one or more of the above issues.

SUMMARY

It has been recognized that it would be advantageous to develop systems and methods for controlling the shape of the ends of a composite barrel section within geometric tolerances during movement and during storage.

It has also been recognized that it would be advantageous to have systems and methods for controlling the shape of the end of a composite barrel section that can be quickly and easily installed or removed.

It has also been recognized that it would be advantageous to have systems and methods for accurately controlling the shape of an end of a composite barrel section within a dimensional tolerance that supports further fabrication and assembly steps.

In accordance with one embodiment thereof, the present invention provides an edge stabilizer for a composite structure. The edge stabilizer includes an elongate edge support segment, defining a geometric shape of an edge of the composite structure, and a connector, configured to attach the edge support segment to the edge of the composite structure. The edge support segment includes first and second halves configured to attach together around the edge, each half including a shoulder, opposing mating relationship of the shoulders defining a slot for receiving the edge.

In accordance with another aspect thereof, the invention provides a system for stabilizing an edge of a composite barrel section. The system can include a plurality of elongate edge support segments, a connector, configured to attach the edge support segments to the edge, and a moveable cart, the barrel section being supportable upon the cart. The elongate edge support segments define a geometric shape of an edge of the composite barrel section, and include first and second halves, the halves configured to attach together around the edge, each half including a shoulder, opposing mating relationship of the shoulders defining a slot for receiving the edge.

In accordance with yet another aspect thereof, the invention provides a method for stabilizing an edge of a composite barrel section. The method includes the steps of attaching a plurality of elongate edge support segments along the edge of the barrel section at first and second ends thereof to form first and second end rings, each edge support segment having a slot for receiving the edge, interlocking the edge support segments end-to-end upon the edge, and placing the composite barrel section upon a moveable cart.

BRIEF DESCRIPTION OF THE DRAWINGS

Additional features and advantages of the invention will be apparent from the detailed description which follows, taken in conjunction with the accompanying drawings, which together illustrate, by way of example, features of the invention, and wherein:

FIGS. 14A and 14B are perspective and side views, respectively, of an embodiment of a barrel assembly ring cart with rotational bearings;

FIG. 15A is a perspective view of an end of a barrel segment with an end ring segment installed therein in accordance with the present disclosure;

FIG. 15B is a perspective view of a segment of one embodiment of an end support ring in accordance with the present disclosure;

DETAILED DESCRIPTION

Figure 1:
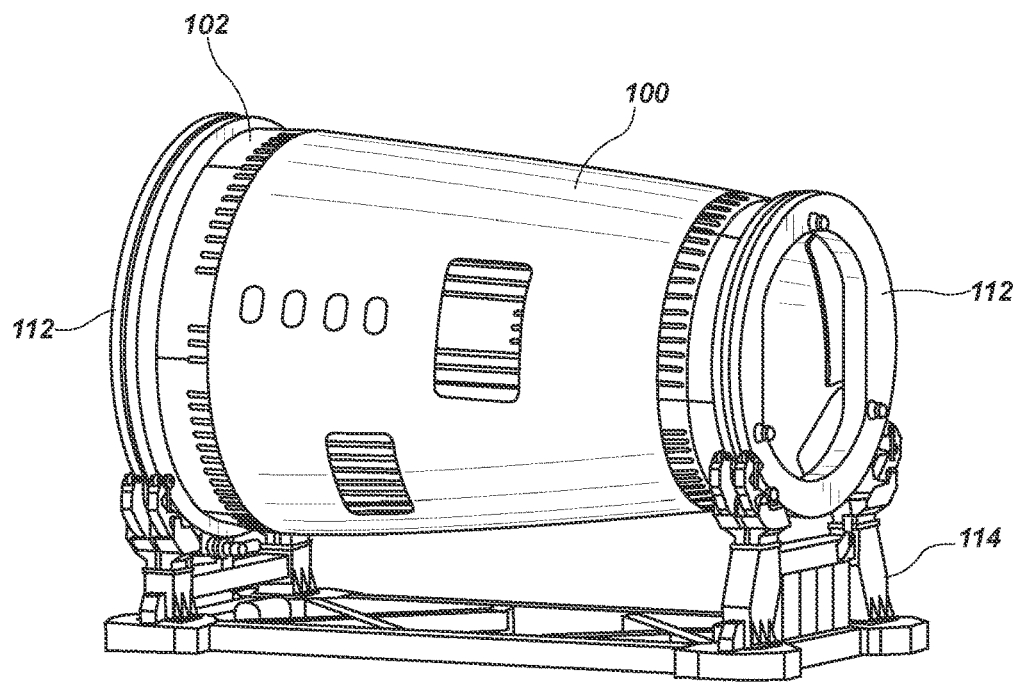
FIG. 1 is a perspective view of an aircraft barrel section supported by a mandrel mounted on a pair of mandrel support rings.

Reference will now be made to exemplary embodiments illustrated in the drawings, and specific language will be used herein to describe the same. It will nevertheless be understood that no limitation of the scope of the invention is thereby intended. Alterations and further modifications of the inventive features illustrated herein, and additional applications of the principles of the inventions as illustrated herein, which would occur to one skilled in the relevant art and having possession of this disclosure, are to be considered within the scope of the invention.

As noted above, large barrel-shaped fuselage sections of composite material can be fabricated on a mandrel having a size and shape that matches the desired inner mold line of the composite shape. After curing of the composite material, the inner mandrel is then removed in preparation for further manufacturing and assembly steps. Such fuselage sections can be quite large, and are frequently initially assembled without an internal frame structure.

A composite barrel section without an internal frame in post-cure condition may not be as stiff as desired for transport to subsequent manufacturing operations. Consequently, new equipment and methods have been developed in the aircraft industry for carrying and holding composite fuselage sections after removal from a mandrel. After removal from the mandrel, however, controlling the shape of the barrel within geometric tolerances during transport (e.g. from cell to cell during assembly) and/or during storage presents some challenges.

Some prior methods for holding and transporting large composite barrel sections may not maintain the geometric shape of the section as desired. For example, composite barrel sections can be attached (e.g. clamped) to end stabilizer rings that match the geometric shape of the ends of the barrel section but do not maintain geometrical dimensioning and tolerance ("GD&T"). Such, stabilizer rings may be attached to an assembly cart for moving the barrel section from point to point in an assembly process. Unfortunately, the use of end stabilizer rings alone may not hold the barrel section shape within desired geometric tolerances. This can result in increased labor costs during installation of frame members and other appurtenances, for example, or involve reworking in order to join the barrel section to an adjacent barrel section. Advantageously, the system and method disclosed herein helps to address these issues and is believed to improve the quality of joints in adjacent barrel sections and to improve the quality of frame installation.

Figure 2:
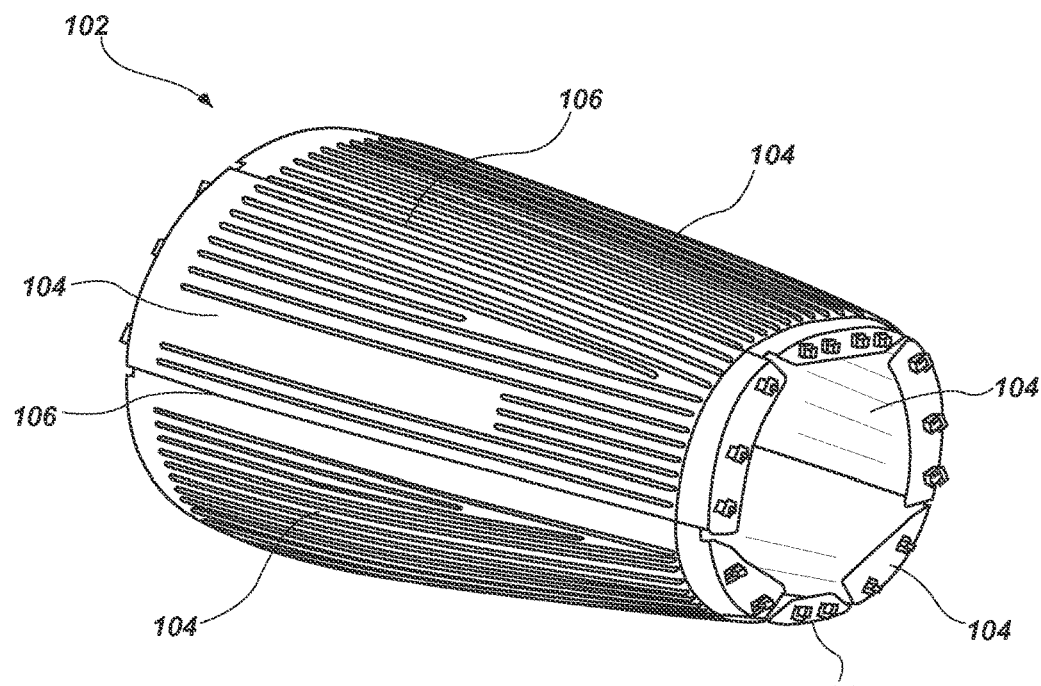
FIG. 2 is a perspective view of a six-section mandrel for forming an aircraft barrel section.

Many types of composite structures are fabricated using a mandrel, on which carbon fiber strands are wound and then impregnated with epoxy resin, or pre-impregnated carbon fiber fabric, tape, and/or tows are laid up, and then cured. Shown in FIG. 1 is a perspective view of an aircraft barrel section 100 supported by a six-piece removable inner mandrel 102. A perspective view of the six-section mandrel 102 is shown in FIG. 2. While this particular mandrel 102 has a tapered cylindrical shape, and is designed for fabrication of a tapered rearward segment of an aircraft fuselage, this is only one exemplary configuration. It will be apparent that other mandrel shapes and configurations can be provided for fabricating barrel sections of a variety of shapes and for a variety of applications. The barrel sections shown and described herein have a generally cylindrical shape. As used herein, the term "generally cylindrical" is intended to include a wide variety of cylindrical or cylinder-like shapes, including cylinders that are tapered or irregular, cylinders that are not circular in cross section at any given point, and other possible variations.

The sections 104a-104f of the mandrel are removably joined along longitudinal seams 106, and are attachable at their fore end 108 and aft end 110 to circular mandrel support rings 112, which are mounted to a roller support frame 114. In one embodiment the mandrel support rings are of an iron-nickel alloy, which has good dimensional stability with temperature changes. However, other materials can also be used for the mandrel support rings, and they can be configured differently from the configuration shown in the drawings. The roller support frame 114 and mandrel support rings 112 allow the mandrel 102 to be axially rotated during assembly build-up of the barrel section 100. The entire assembly of the mandrel 102 and support frame 114 can be moveable so that it can be placed in an autoclave (not shown) for heat curing after initial layup of the composite barrel section 100. It is to be understood that the mandrel configuration and method of composite barrel fabrication that are shown and described herein are only one example of suitable systems and methods. Other methods and systems can also be used for fabricating a composite barrel, and the present disclosure is not limited to one particular method or system.

Once the composite barrel section 100 is fabricated and cured, the mandrel 102 can be removed from within the barrel section 100. The adjacent longitudinal segments 104 of the mandrel 102 can be detached from the mandrel support rings 112 and removed along the seams 106, and the mandrel sections 104 can be withdrawn one-by-one from against the inner surface of the barrel section 100. Those of skill in the art will appreciate that this description is general in nature, and that there can be many additional detailed operational steps and apparatus involved in this process. It will be apparent that removal of the mandrel 102 will also remove the structure that supports the barrel section 100 upon the mandrel support rings 112. Consequently, temporary supports (not shown) can be used to support the curved barrel section 100 while the mandrel 102 is being removed from within it.

Viewing FIGS. 3-6, after the mandrel 102 has been removed, or concurrently with removal of the mandrel sections, a pair of end support rings 120, 122 can be attached to the fore end 124 and aft end 126 of the barrel section 100, respectively. A barrel section 100 with one rear end ring 122 attached and another ring 102 positioned near its attachment point at the front end 124 of the barrel section 100 is provided in FIG. 3. The end rings 122, 124 can be installed immediately after mandrel removal, and help maintain the barrel shape within engineering tolerances throughout subsequent assembly and transport of the barrel section 100.

The end support rings 120, 122 are made up of a series of ring segments, indicated generally by numeral 128, that removably attach to each other. The assembled end rings define a perimeter that is congruent (i.e. same size and shape) with the respective end 124, 126 of the barrel section 100. In one embodiment, the end support ring segments include a slot 130, which defines the nominal barrel shape of the perimeter of the respective end 124, 126, within acceptable geometric tolerances. Viewing FIG. 3 in particular, the front edge 124 of the barrel section 100 fits into the slot 130, and the front end ring 120 can be attached to the barrel section with clamps (not shown). This allows the complete ring to hold the shape of the barrel section at its fore and aft ends.

Each segment 128 of the end support rings 120, 122 shown in the figures include radial spokes 132, which are each removably attached to an inner ring segment 134 and an outer ring segment 136. Elements 128, 134 and 136 are commonly labeled in both the fore end ring 120 and aft end ring 122 because of their similar shape and function, even though these structures can be of different size and shape in the respective end rings. For simplicity, the various parts of only some of the ring segments 128 are labeled in any one figure. The inner and outer ring segments 134, 136 associated with a given spoke 132 are removably attachable to the corresponding segments of the next adjacent ring segment around the circumference of the ring 120, 122, so that the entire end support ring can be assembled in place from multiple separate pieces, and dismantled in a similar way, and so that any or all of the spokes 132 and the inner ring 134 can be selectively removed, as desired. This configuration retains dimensional accuracy of the barrel during mandrel extraction and barrel storage, while providing flexibility for subsequent manufacturing processes.

Figure 3:
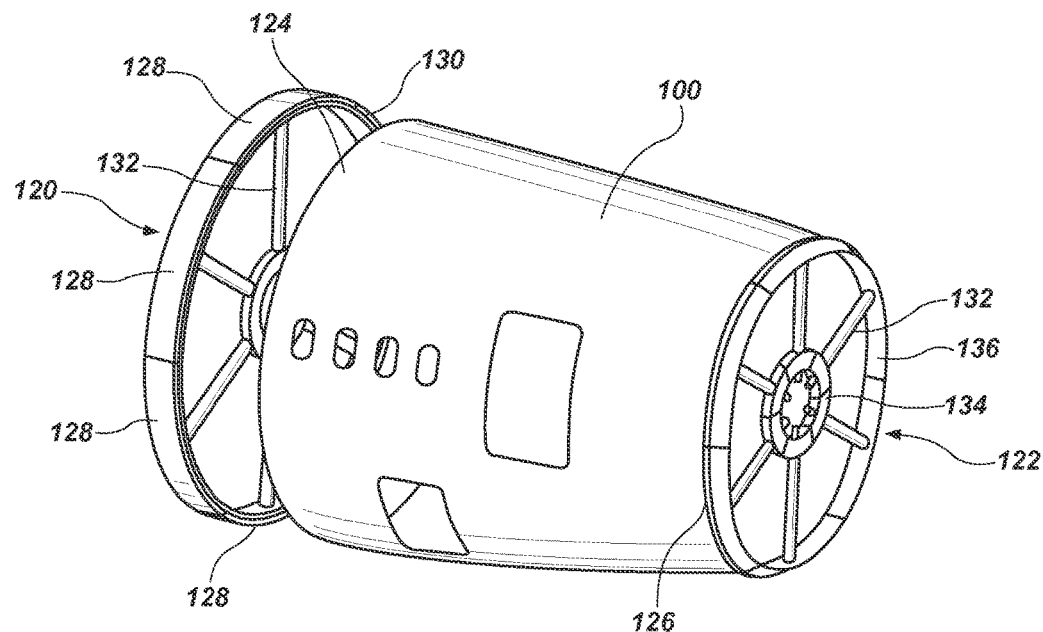
FIG. 3 is a rear perspective view of an aircraft barrel section with a rear end support ring installed, and a front end support ring positioned near the front perimeter edge of the barrel section.
Figure 4:
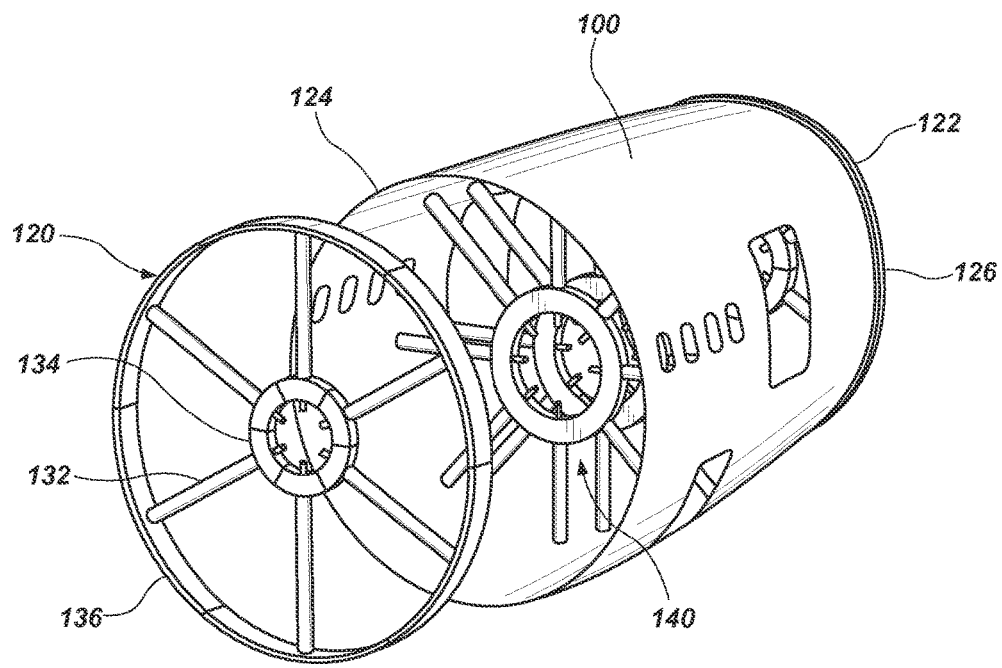
FIG. 4 is a front perspective view of an aircraft barrel section with a rear end support ring and internal support rings installed, and a front end support ring positioned near the front perimeter edge of the barrel section.
Figure 5:
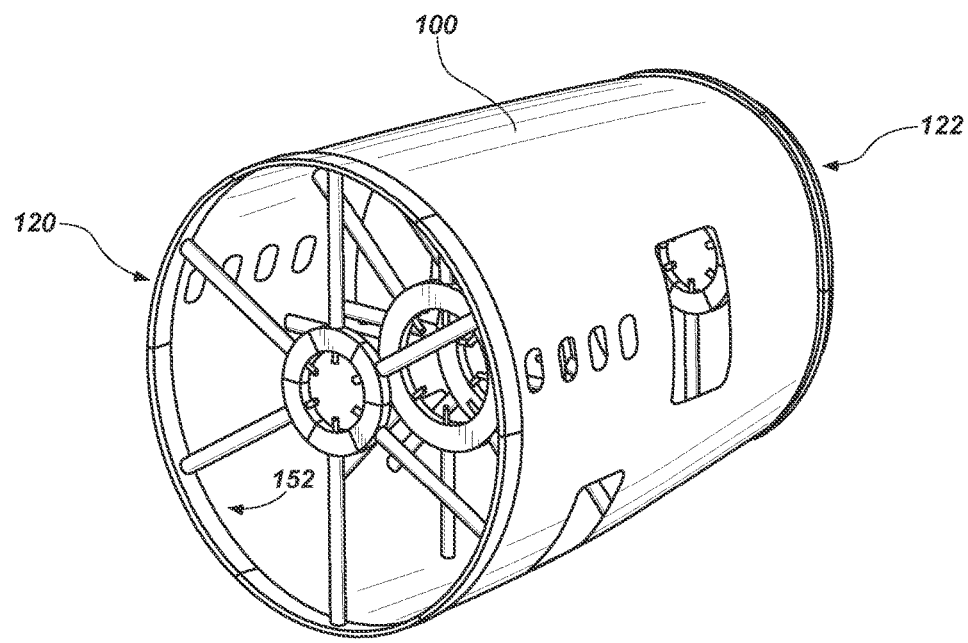
FIG. 5 is a front perspective view of an aircraft barrel section two end support rings and two internal support rings installed.

While the end support rings 120, 122 shown in FIG. 3 include six segments 128, it is to be appreciated that end support rings with a greater or lesser number of segments (e.g. five segments, eight segments, etc.) can also be used. The number of segments 128 in the end ring can match the number of mandrel segments 104. For example, a six segment end ring 120, 122 can be used where a six segment mandrel 102 is used for fabrication of the barrel section 100. It is also to be appreciated that the end support rings 120, 122 can be configured to define a circular shape as shown in the figures, or some other desired shape. For example, in the embodiment shown in FIG. 3 the aircraft fuselage barrel section 100 has a substantially circular cross-section at each of the fore and aft ends 124, 126, as is quite common. However, an end support ring 120, 122 can be configured to match a non-circular cross-section also, which can be found in aircraft and other structures that include composite barrel sections.

The end rings 120, 122 help maintain the defined barrel shape within desired tolerances during the assembly process. They also allow for an increase in process control capability. For example, without end rings that preserve the geometric shape of the barrel section, rework of the composite material may be undertaken in order to achieve the defined inner mold line surface. The end rings 120, 122 can remain in place as long as desired to help maintain the shape of the barrel section 100, which can be until the point of installation of frame components or other structure which spatially conflicts with the rings. Advantageously, the installation of frame components and other structures within the barrel section 100 will tend to stiffen and strengthen the barrel section, gradually supplanting the function of the end rings 120, 122.

Figure 6:
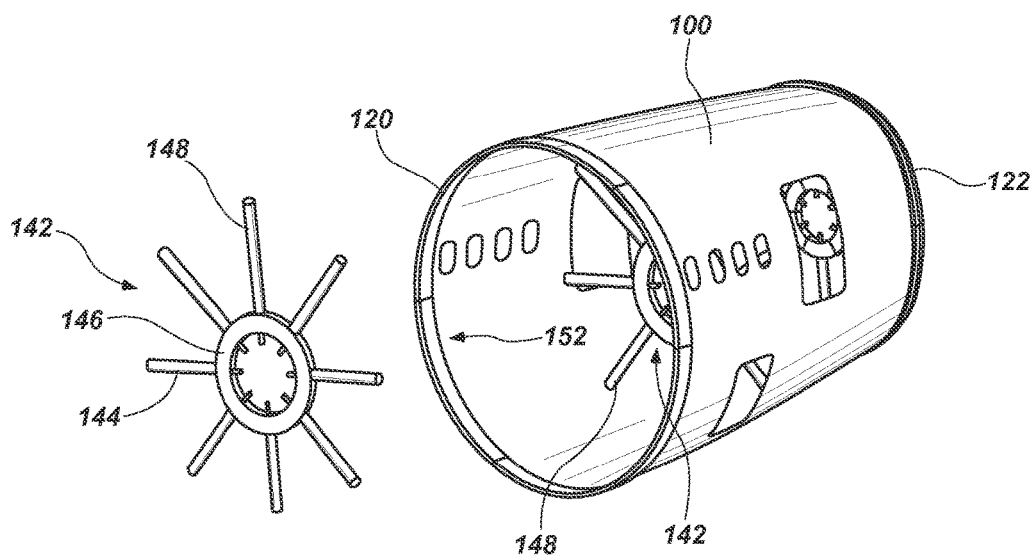
FIG. 6 is an exploded perspective view of an aircraft barrel section showing one internal support ring installed and another outside the barrel section.
Figure 10:
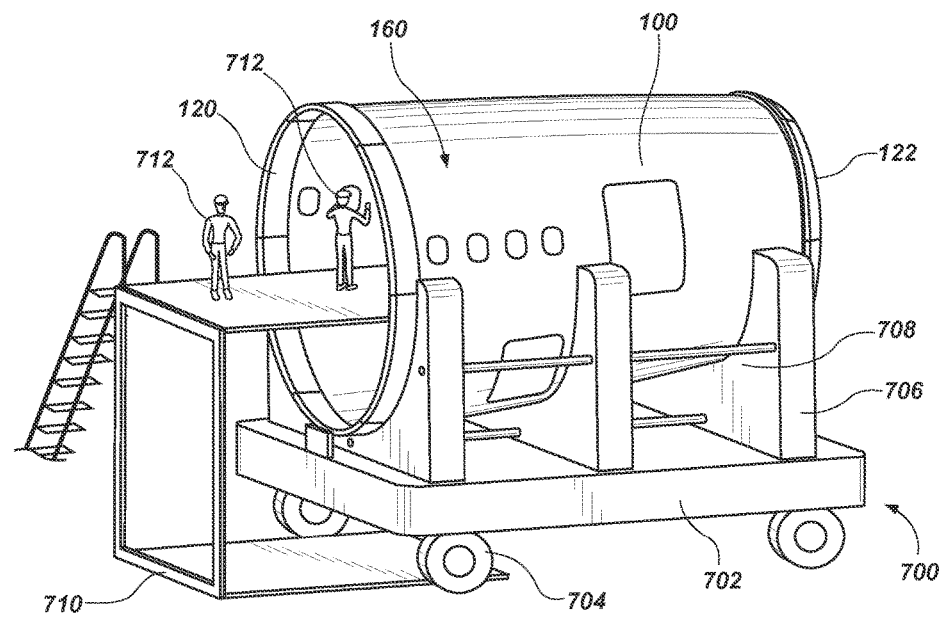
FIG. 10 is a front perspective view of an aircraft barrel section with internal and end rings, installed on a moveable transport cart.

Additionally, the entire end ring 120, 122 or individual segments of it can be removed as desired to provide accessibility, such as for assembly or other operations in a given region inside the barrel section, and later replaced if desired. For example, as shown in FIGS. 6 and 10, the spokes 132 and the inner ring 134 can be removed from the fore-end ring assembly 120, to provide access to the interior of the barrel 100. This leaves the outer ring 136 in place, which continues to provide strength and geometrical control around the perimeter of the front edge 124 of the barrel section until such time as the internal portions of the end ring 120 are reinstalled, or the barrel section 100 is attached to an adjacent barrel section, for example. Finally the end rings 120, 122 will be removed before a given barrel section 100 is attached to an adjacent barrel section at the particular end (i.e. fore or aft).

In addition to the end support rings 120, 122, the system and method disclosed herein also provides an internal or "mid" support ring assembly 140, which is shown in FIGS. 4-7. An internal support ring assembly 140 can include one or more individual spoked rings 142, each including a plurality of outwardly extending spokes 144 that are removably attachable to a central ring or hub 146. As with the end rings 120, 122, the number of spokes 144 associated with each spoked ring 142 and the spacing between spokes can vary. While internal support rings 142 are shown in the figures having eight spokes 144, a greater or lesser number of spokes can be associated with these devices. The spokes 144 can be configured to telescope in length, so that they can be adjusted to conform to barrel sections of different sizes and shapes, or to different longitudinal positions within a barrel section having a tapering size. The spokes 144 can include a bearing surface, such as a bearing pad (not shown), on their distal end 148, which directly abuts the interior surface 152 of the barrel section 100. The configuration of the bearing pad, including its size, shape, functionality and materials of construction, can be selected by one of skill in the art to facilitate barrel shape control and other desired characteristics.

Figure 7:
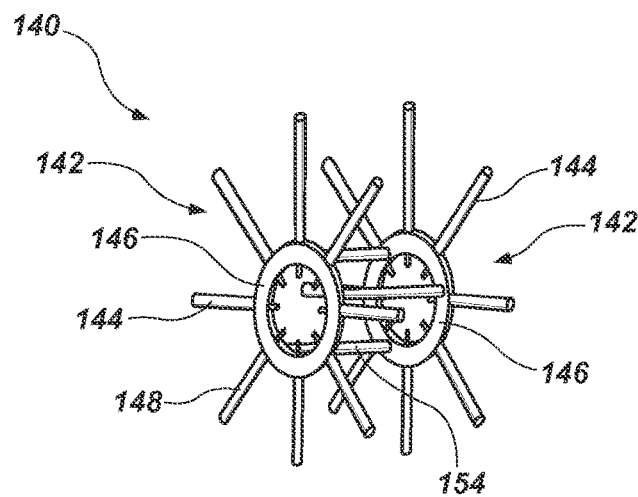
FIG. 7 is a perspective view of a pair of internal support rings connected by three longitudinal members.
Figure 9:
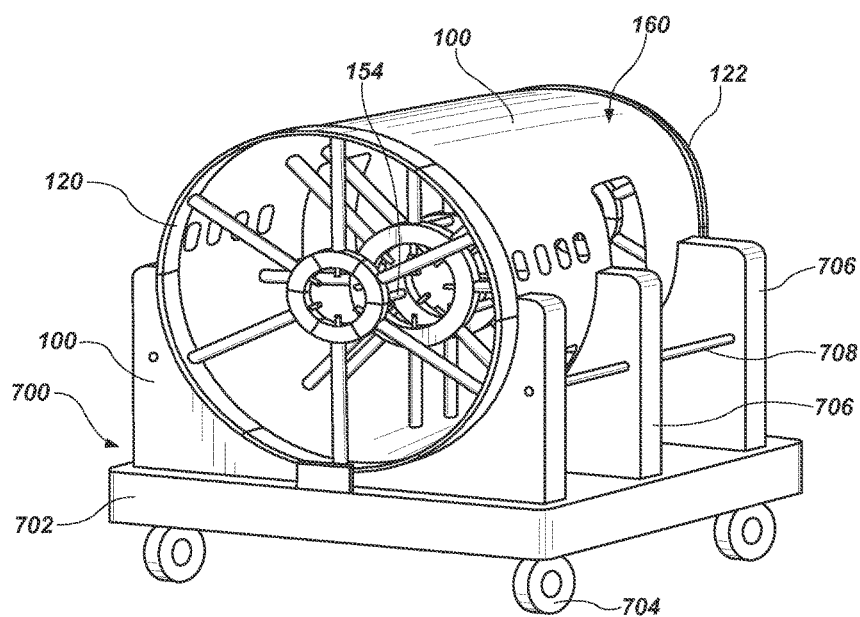
FIG. 9 is a front perspective view of an aircraft barrel section with internal and end rings installed on a moveable transport cart.

The internal support ring assembly 140 can include multiple internal support rings 142, which are attached to each other with longitudinal members 154 (e.g. rods). The longitudinal members are shown in FIGS. 7 and 9. The longitudinal members 154 can be configured to hold the central rings or hubs 146 substantially parallel to each other and at a desired distance, so that the longitudinal members 154 and the rings 146 are perpendicular to each other. This allows the longitudinal members 154 to define a horizontal datum, substantially parallel to the longitudinal axis of the barrel 100, and the spoked rings 142 and the spokes 144 to each define a vertical datum that is perpendicular to the longitudinal axis of the barrel. When the spokes 144 are attached to the central rings 146 and placed in abutting contact with the curved interior surface 152 of the barrel section 100 (which defines a third datum), a three-datum geometric control configuration is created. This helps maintain the geometric shape of the barrel section 100 better than end rings alone, and helps prevent sagging and flexure of the barrel section 100. The interior support ring assembly 140 helps to control the interior nominal shape of barrel 100.

The adjacent interior spoked rings 142, being connected to each other and adjustable between stations (i.e. fore and aft) help to maintain the nominal shape of the barrel 100 during frame installation or other operations. The spokes 144 of the interior support assembly 140 are telescopingly adjustable to a repeatable state to support the internal mold line shape within engineering tolerances. The internal support rings are also moveable within the barrel 100 from station-to-station to maintain the barrel shape as frames and other components are installed.

The order of installation of the internal support assembly 140 can vary. For example, the internal support assembly 140 can be installed before one or both of the end rings 120, 122 are attached to the ends of the barrel section 100. Alternatively, the end rings 120, 122 can be attached first, and the internal support assembly 140 can be installed afterward. For example, for an aircraft fuselage section having a variety of openings, as shown in the figures herein, the rings 146, spokes 144 and longitudinal members 154 can be inserted through an opening in the barrel section (e.g. a door opening) after the end rings are in place, and assembled inside the barrel section. It is to be understood that the sequence of installation and/or removal of various portions of the system shown herein can vary from situation to situation.

This configuration of the end rings 120, 122 and the internal spoke assemblies 140 provides barrel interface tooling that is controlled by removable structure to control the exterior shape of the barrel 100 within engineering tolerances. Advantageously, the end rings 120, 122 and spoke rings 142 are reusable barrel after barrel. Additionally, the internal spoke shape control tooling can be installed in a given barrel segment 100 immediately after curing of the barrel segment (i.e. immediately after mandrel removal) and before further product assembly begins. Workers can begin the assembly process by installing product parts upon or within the barrel sections while the spokes are in place. Later the spokes can be removed by workers without disrupting product assembly.

Figure 8:
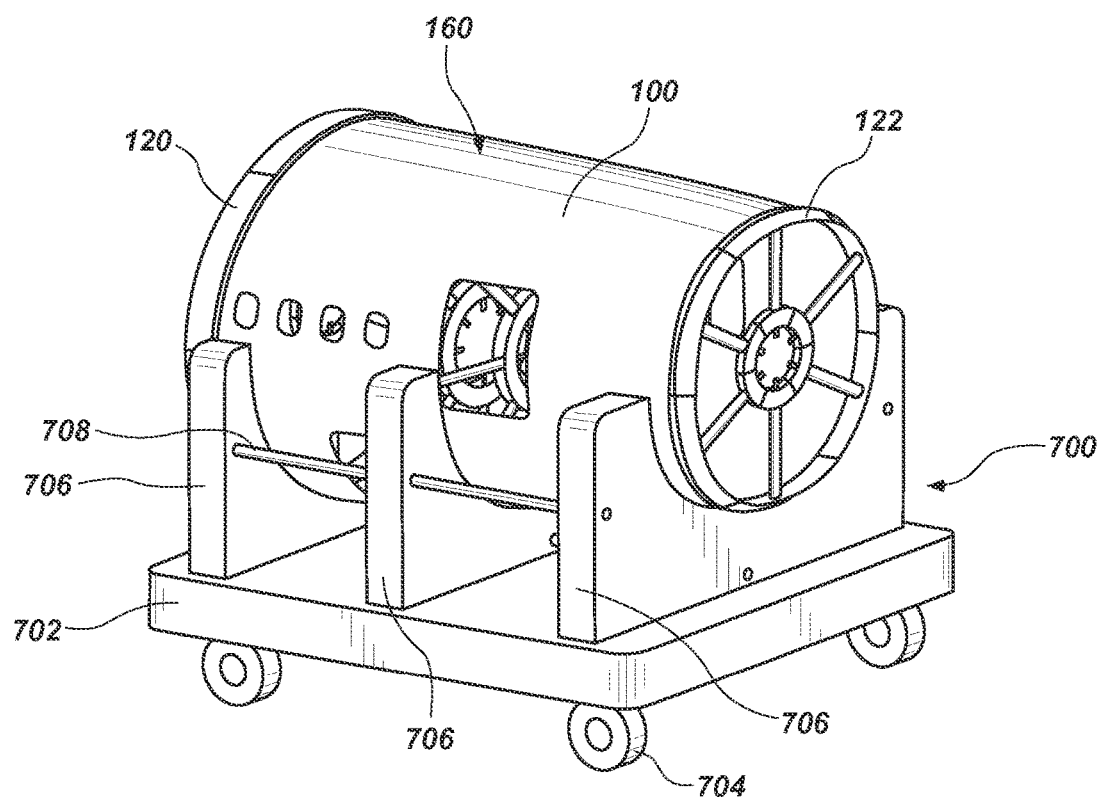
FIG. 8 is a rear perspective view of an aircraft barrel section, with internal and end rings installed, on a moveable transport cart.

With the end rings 120, 122 and internal supports 140 in place, the stabilized barrel section 100 can be transported between various assembly points and/or placed in a storage location upon a moveable datum controlled transport cart. Three views of an embodiment of a moveable transport cart 700 for a composite barrel segment 100 are shown in FIGS. 7-9. The cart 700 generally includes a frame 702 that is supported on wheels 704, with a plurality of upstanding supports 706 configured to contact and support the outer surface 160 of the barrel 100 to substantially retain its nominal shape. The upstanding supports 706 of the cart 700 can substantially conform to a shape of the outer surface of the composite barrel 100 in an unconstrained condition, which secures the barrel reference to engineering tolerances. In one embodiment, the upstanding supports 706 conform to half a circumference of the composite barrel 100 outer surface 160. Where the barrel shape includes a taper, as shown in the figures, the curvature of the interior mating surfaces of the upstanding supports can vary accordingly. The cart 700 and the barrel section 100 can also include devices, such as markings, etc., to facilitate placement of the barrel section on the cart in a desired location and orientation. A variety of such devices can be conceived by those of skill in the art.

Any number of upstanding supports 706 can be used. The upstanding supports thus provide a shape tool, holding the barrel 100 within engineering tolerances during movement from one work cell to another while maintaining the desired geometric configuration. The upstanding supports 706 can be attached to each other by longitudinal rods 708, which help ensure the position of these supports and provide additional geometric control. Viewing FIG. 10, this configuration of the cart 700 helps facilitate movement of the barrel section 100 to any desired work station 710, where workers 712 can perform any desired manufacturing or assembly operation upon the barrel section. In FIG. 10, the workstation 710 includes a platform that can be extended into the barrel section 100 to allow the workers 712 to install frame members and/or other components, or perform other operations therein. As discussed above, for this type of interior work station, the spokes 132 and central ring 134 of the end ring 120 at the fore end of the barrel 100 can be removed, leaving only the perimeter ring 136 at that end of the barrel 100. Likewise, the interior support assembly 140 can be partially or completely removed to allow insertion of the platform. It is to be appreciated that a wide variety of types of work stations can be employed in the manufacturing and assembly process, and the work station 710 shown in FIG. 10 is a simplified representation of only one type of work station.

Figure 11:
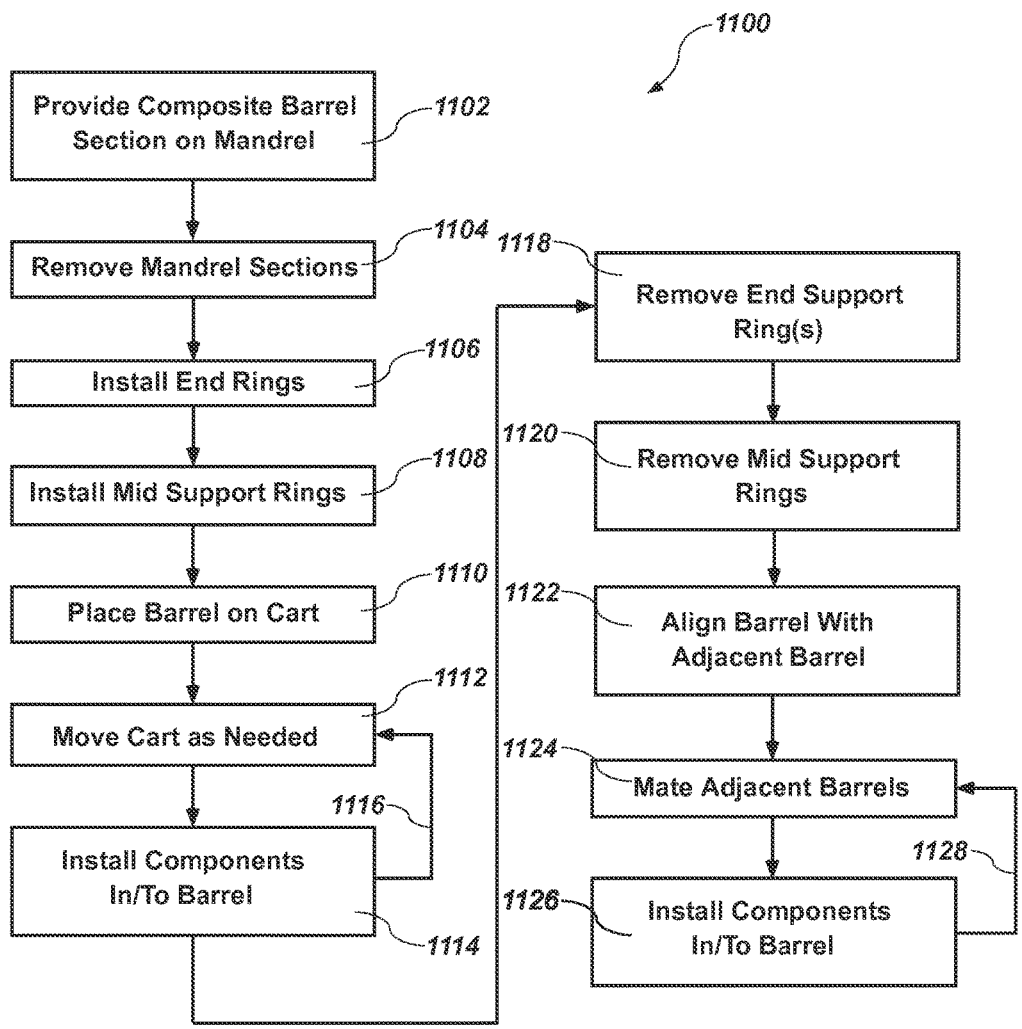
FIG. 11 is flowchart of an embodiment of a method for stabilizing a cured composite fuselage barrel according to the present disclosure.

In view of the above, one embodiment of a method 1100 for transporting a composite barrel in accordance with the present disclosure is outlined in the flowchart of FIG. 11. It is to be understood that the steps outlined in FIG. 11 can be performed in a different order than shown, and, further, while certain variations in the order of the steps are discussed herein, other variations can also be used. This embodiment of the method can be described as including the steps of providing a composite barrel section 1102 upon a mandrel, then removing the mandrel sections from against the inner surface of the composite barrel 1104. The mandrel section can be sequentially removed, and this can be done prior to or concurrently with the step of attaching first and second end rings 1106 in the barrel section. Interior or "mid" support rings are also attached 1108 against an inner surface of the composite barrel, the supports including a hub and a plurality of adjustable spokes extending from the hub to the inner surface. Attaching the mid supports can include longitudinally affixing at least two supports in substantially parallel planes that are substantially perpendicular to the inner surface of the barrel.

The composite barrel is then placed upon shape-conforming supports on a moveable platform or cart 1110, which can then be moved from place to place as needed 1112, such as between work positions that are configured for installing components in or to the barrel section 1114, or performing other manufacturing or assembly operations on the composite barrel. Moving the cart from place to place and performing additional manufacturing actions on or to it can be performed repeatedly, as indicated by the arrow 1116.

At a suitable time, typically at some point during installation of frame members and other components within the barrel section 1114, the end support rings can be removed 1118 from the barrel section in preparation for ultimate connection of the barrel section with another barrel section 1122. The mid support rings and their spokes can also be removed 1120 (perhaps only partially at first) at some point during installation of components in or to the barrel section. This will presumably be before the barrel section is attached to another barrel section, though it could conceivably occur after such attachment. Moreover, the order of removal of the mid supports and end rings can vary, and since the spokes of the mid supports are individually removable and the segments of the end rings are detachable, the end rings and mid supports can be completely or partially removed at any time, as desired. For example, one or more but not all of the spokes of a given mid support can be removed at any time during the manufacturing process as desired to facilitate various manufacturing or assembly operations within the barrel section. Additionally, some assembly processes can be performed by workers while some or all of the spokes are in place, and in certain cases spokes can be selectively removed by workers without disrupting product assembly.

When all desired preparations have been made, the composite barrel can be positioned and aligned in an opposing edge-to-edge circumferential alignment with an adjacent composite barrel 1122, to facilitate attachment or mating of the composite barrel 1124 with the adjacent composite barrel. After mating of the barrel section, additional components can be installed in or on the barrel section 1126 to continue the manufacturing and assembly process, and this can be performed repeatedly, as indicated by the arrow 1128.

Figure 12:
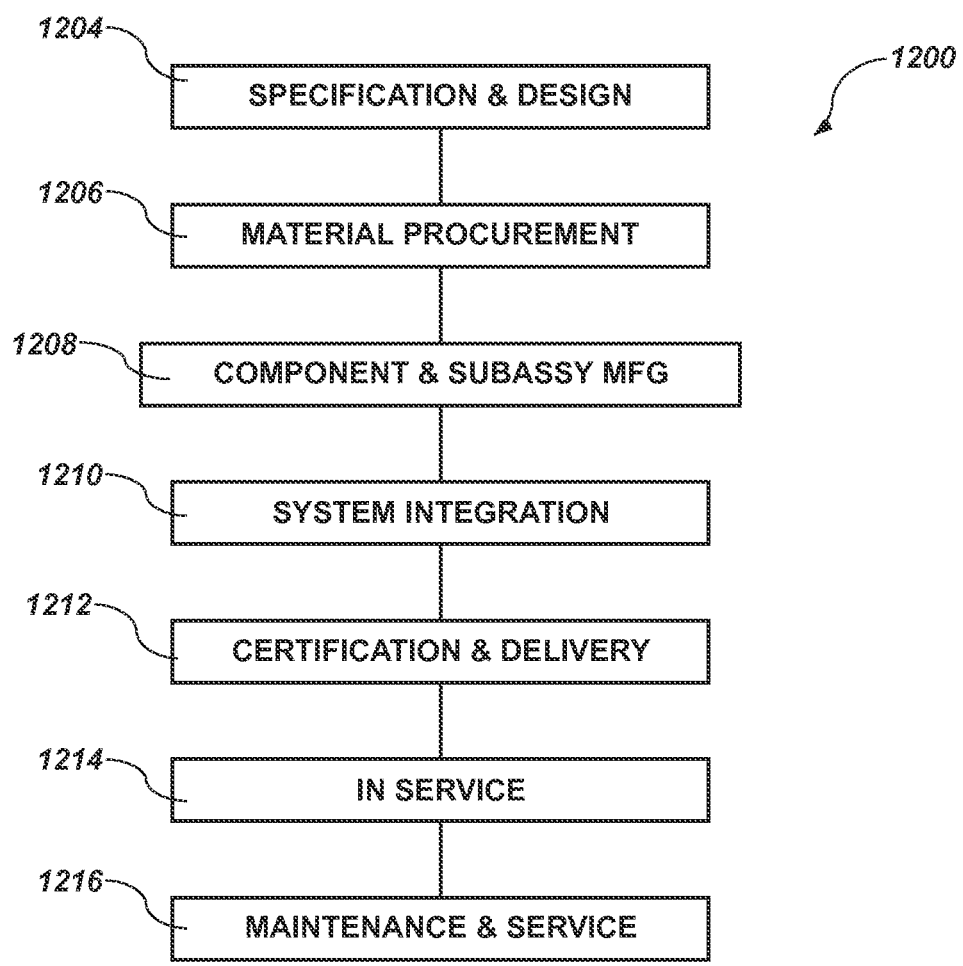
FIG. 12 is a flow diagram of aircraft production and service methodology.
Figure 13:
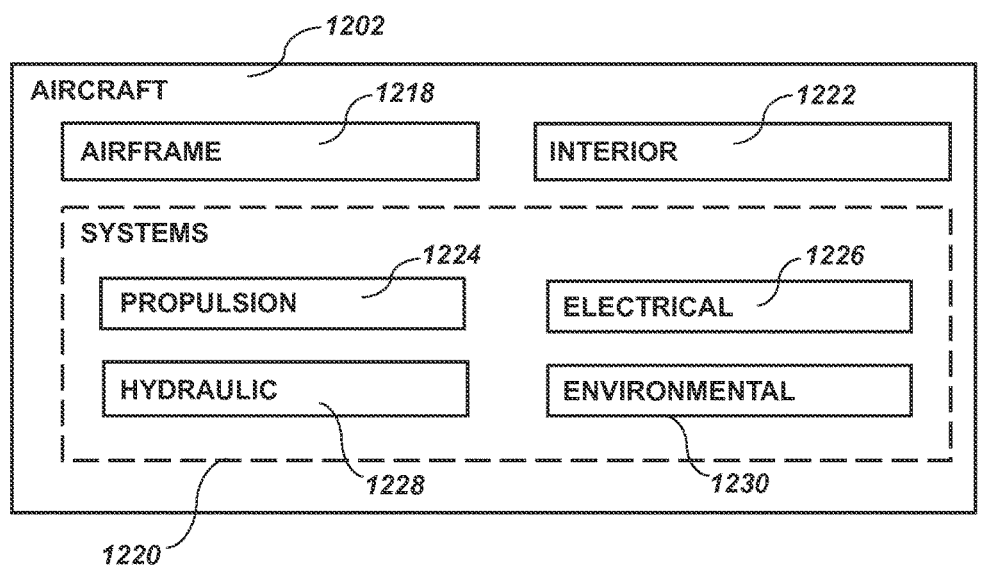
FIG. 13 is a block diagram of an aircraft.

Embodiments of the disclosure may be described in the context of an aircraft manufacturing and service method 1200 as shown in FIG. 12 and an aircraft 1202 as shown in FIG. 13. During pre-production, exemplary method 1200 may include specification and design 1204 of the aircraft 1202 and material procurement 1206. During production, component and subassembly manufacturing 1208 and system integration 1210 of the aircraft 1202 takes place. Thereafter, the aircraft 1202 may go through certification and delivery 1212 in order to be placed in service 1214. While in service by a customer, the aircraft 1202 is scheduled for routine maintenance and service 416 (which may also include modification, reconfiguration, refurbishment, and so on).

Each of the processes of method 1200 may be performed or carried out by a system integrator, a third party, and/or an operator (e.g., a customer). For the purposes of this description, a system integrator may include without limitation any number of aircraft manufacturers and major-system subcontractors; a third party may include without limitation any number of venders, subcontractors, and suppliers; and an operator may be an airline, leasing company, military entity, service organization, and so on.

As shown in FIG. 13, the aircraft 1202 produced by exemplary method 1200 may include an airframe 1218 with a plurality of systems 1220 and an interior 1222. Examples of high-level systems 1220 include one or more of a propulsion system 1224, an electrical system 1226, a hydraulic system 1228, and an environmental system 1230. Any number of other systems may be included. Although an aerospace example is shown, the principles of the invention may be applied to other industries, such as the automotive industry.

Apparatus and methods embodied herein may be employed during any one or more of the stages of the production and service method 1200. For example, components or subassemblies corresponding to production process 1208 may be fabricated or manufactured in a manner similar to components or subassemblies produced while the aircraft 1202 is in service. Also, one or more apparatus embodiments, method embodiments, or a combination thereof may be utilized during the production stages 1208 and 1210, for example, by substantially expediting assembly of or reducing the cost of an aircraft 1202. Similarly, one or more of apparatus embodiments, method embodiments, or a combination thereof may be utilized while the aircraft 1202 is in service, for example and without limitation, to maintenance and service 1216.

As noted above, the end support rings can be made up of a series of ring segments that removably attach to each other. The end support rings are one embodiment of an edge stabilizing device or system that helps retain the geometric shape of the barrel segment during the assembly processes, until the barrel segment is attached to an adjacent barrel segment, and/or is provided with additional structural members (internal or external) that sufficiently reduce the likelihood that the geometry of the barrel section will vary from the desired shape and size. Various embodiments and more detailed information regarding an edge stabilizing device in accordance with the present disclosure and its method of use are provided with respect to FIGS. 15-35.

One embodiment of a transport cart that can be used during storage or assembly operations with respect to composite barrel sections is shown and described above with respect to FIG. 8. Another type of transport cart is shown in FIGS. 14A and B. Shown in these figures is an assembly ring cart 1400 having a base 1402 with wheels 1404, and a pair of upright support frames 1406 at each end of the cart that support ring roller bearings 1408. A pair of assembly rings 1410 are rotatably supported by the roller bearings 1406, and interconnect to the ends of a composite barrel section 1412 by a plurality of finger clamps 1414. After the mandrel segments are removed from the barrel section 1412 in the manner described above, the finger clamps 1414 can be attached to the exposed edges of the barrel section, and attached around the perimeter of the respective assembly ring 1410. These assembly rings 1410 are rollably supported on the roller bearings 1408, allowing the barrel section 1412 to be axially rotated as desired for various assembly operations as the cart is moved from station to station in an assembly operation.

The orientation of the barrel section 1412 can be controlled by the assembly ring cart 1400 from assembly station to assembly station without internal frames, or internal stiffening frames can be installed if desired. However, it has been found that axial rotation of the barrel 1412 via rotation of the assembly rings 1410 on the ring cart 1400 during frame installation can cause slight deformation of the skin of the barrel section 1412 in some circumstances. The barrel 1412 is frequently rotated during the assembly and manufacturing process, and this rotation risks localized deformation of the skin.

As discussed above, end support rings can be attached to the edge of the barrel section to stabilize it and preserve its geometry. As shown in FIG. 15A, an end support ring segment 1500 can be attached to the edge 1502 of a barrel segment 1504 to define the nominal barrel shape of the perimeter of the end of the barrel, within desired geometric tolerances. A closer view of the end support ring segment 1500 is shown in FIG. 15B. Unlike many of the end support ring embodiments discussed above, this embodiment does not include internal spokes, but instead is configured to interconnect with other ring segments to define an open ring at the end of the barrel 1504, to stabilize the geometry of the barrel section and allow internal access into the barrel section for assembly operations. However, it is to be appreciated that the embodiment of FIGS. 15A, B can also be configured with support spokes like the end ring 120 shown in FIGS. 3 and 4.

The end support rings can be installed in coordination right after mandrel removal, and serve to maintain the barrel shape within engineering tolerances throughout the assembly process and/or during storage. The configuration of the end support rings 1500 and their installation can have a variety of embodiments, depending on their shape and process constraints. In one embodiment, the end support rings 1500 have six segments, which correspond to a six-segment mandrel, like that shown in FIGS. 1 and 2. Each end support ring segment can be installed as soon as the corresponding mandrel segments are removed. As discussed in more detail below, the end support rings 1500 can remain in place until the barrel section 1504 is ready for assembly with other barrel sections, whereupon the end rings can be removed without disturbing the final product.

Advantageously, the end support rings 1500 support direct access to the fuselage skin for clamping and supporting on a transport cart that is configured to rotate the barrel during the assembly process, like the cart 1400 shown in FIGS. 14A and B. Referring to FIGS. 15A and B, in this embodiment, each end support ring segment 1500 includes a plurality of finger clamp slots 1506, which are openings for mechanical gripping of the surface of the barrel section 1504, such as by finger clamps 1508. Closer views of the end support ring segment 1500 are shown in FIGS. 16-19.

Figure 16A:
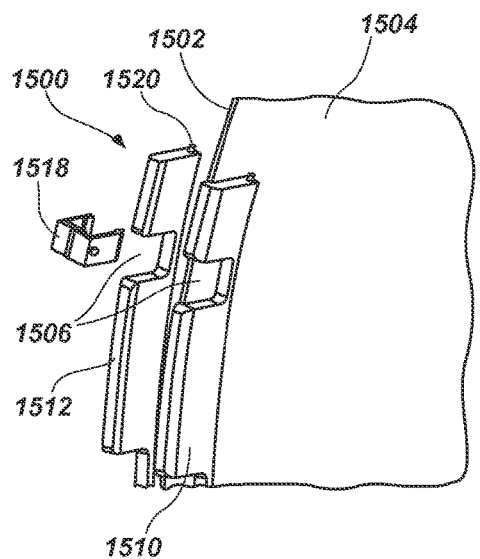
FIG. 16A is an exploded perspective view of a portion of one type of end support ring segment in accordance with the present disclosure.
Figure 16B:
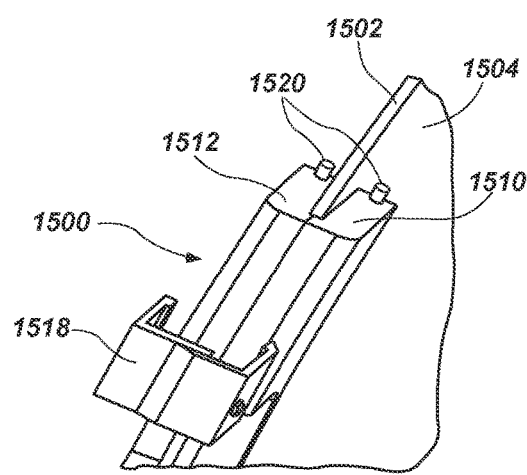
FIG. 16B is a perspective view showing two halves of the end support ring segment of FIG. 16A in place against the end of the barrel segment, with the end support ring segment clamp ready to be installed.

In the exploded view of FIG. 16A it can be seen that the support ring segment 1500 includes two halves 1510 and 1512, which each include an internal shoulder 1514. When the two halves are brought together against the edge 1502 of the barrel section 1504, as shown in FIGS. 16B and 17, the opposing shoulder structures define a U-shaped slot 1516 that encases the barrel edge 1502.

It will be apparent that the dimension of the shoulder 1514 can vary depending on the thickness of the composite material, and can be selected to manipulate the size of the slot 1516 for connection of the ring halves. For example, the depth of the shoulder 1514, measured transversely with respect to the thickness of the barrel section 1504, and thus the thickness of the slot 1516, can be selected to substantially match the thickness of the composite material (within some prescribed tolerance). In one embodiment, the two halves 1510, 1512 of the support ring segment can be sized to provide a slot 1516 that has a thickness T (shown in FIG. 17) that is substantially equal to the thickness of the barrel section 1504, in order to clamp onto the edge of the barrel section 1504 without applying significant compressive or clamping stress to the composite material. Alternatively, the size of the shoulder 1514, and thus the thickness of the slot 1516, can be selected to be some amount less than the thickness of the composite material, so that the two halves 1510, 1512 of the support ring segment clamp onto the edge of the barrel section 1504 with a compressive clamping force. This approach can be desirable to provide a strong connection between the end support rings and the barrel section 1504, such as where the barrel section is to be lifted or supported by the end support rings. In yet another embodiment, the thickness T of the slot 1516 can be slightly greater than the thickness of the composite section 1504, to allow the composite structure to "float" within the slot within some selected tolerance.

Figure 17:
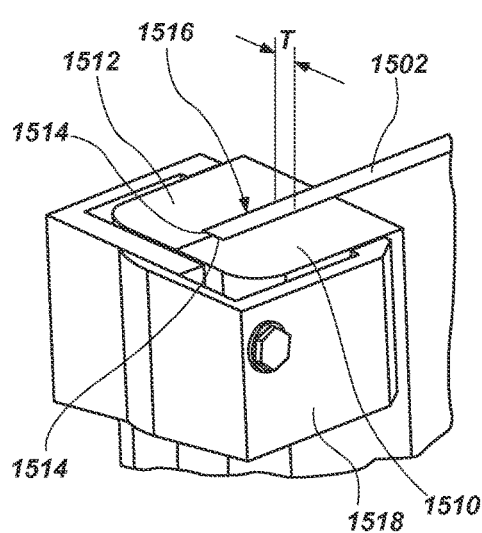
FIG. 17 is a cross-sectional perspective view of an end support ring segment and clamp like that shown in FIG. 16.

In the embodiment shown in FIGS. 16-19, the two halves 1510, 1512 of the ring segment 1500 are fastened to the barrel edge 1502 via a clamp 1518. FIG. 16A shows the ring segment and clamp 1518 in an exploded view, and FIG. 16B shows the two halves of the end support ring segment of FIG. 16A in place against the end of the barrel segment 1504, with the clamp 1518 ready to be installed. A cross-sectional perspective view of an end support ring segment and clamp 1518 like that shown in FIGS. 16A and B is shown in FIG. 17. The clamp 1518 is a connector that fits over the exposed outer edge of the two ring segment halves 1510 and 1512, and mechanically holds the ring segment together against the edge 1502 of the barrel segment 1504. While a two-part clamp 1518 is shown, other types of clamps and other mechanical devices, such as mechanical clamps, hydraulic clamps and electrical solenoid type clamps, can also be used as connectors for attaching the ring segment halves 1510, 1512 to each other and to the edge of the barrel section.

Figure 18:
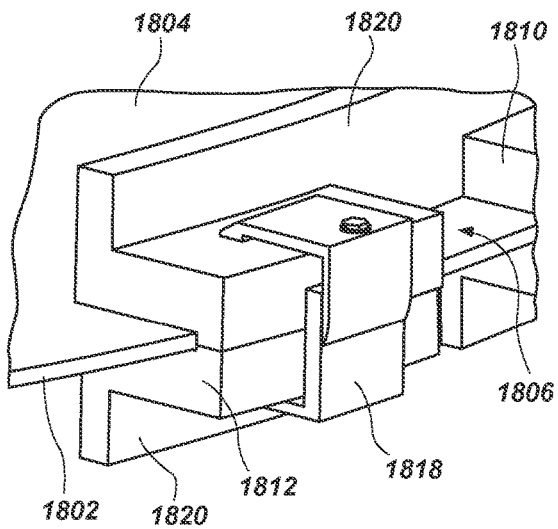
FIG. 18 is a perspective view of another embodiment of an end support ring segment and clamp.
Figure 19:
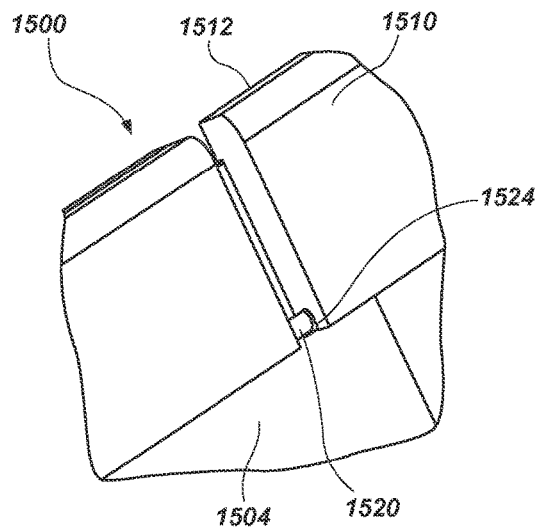
FIG. 19 is a detailed perspective view of one embodiment of adjacent end support rings being connected with a pin-type connector.

Shown in FIG. 18 is a perspective view of another embodiment of an end support ring segment 1800 and clamp 1818. Like the other end ring segments described herein, this configuration includes a pair of segment halves 1810, 1812 that can be attached together and to the edge 1802 of a barrel section 1804 with a clamp 1818 or other attachment device. The segment halves 1810, 1812 each include an internal shoulder, which, when the two halves are brought together against the edge 1802 of the barrel section 1804, defines a U-shaped slot that encases the barrel edge 1802. The segment halves 1810, 1812 also include a plurality of finger clamp slots 1806 for attachment of finger clamps or the like.

In the embodiment of FIG. 18, the segment halves 1810, 1812 also each include a rear flange 1820, which is integral with the respective edge ring half 1810, 1812 and is oriented substantially perpendicular to the surface of the barrel section 1804. This flange 1820 gives increased structural rigidity to the edge ring 1800. Selection of this or another of the edge stabilizer configurations shown herein can depend upon the edge ring material type and properties of the composite section shape that is to be controlled using the given ring segment. The shape of the ring segment can vary in this or other ways to help control the contour of the composite section within engineering defined limits.

The end support ring segments 1500 can also include interlocking structure at their longitudinal ends 1522, to allow connection of adjacent ring segments around the perimeter of the barrel section 1504. This allows a plurality of elongate edge support segments to be attached end-to-end in series along an edge of the composite structure. One type of interlocking structure that can be used to connect adjacent ring segments is a pin-type connector, shown in FIGS. 16A and B, and FIG. 19. This connector includes a pair of pins 1520 extending from the longitudinal end 1522 of one ring segment, which are configured to insert into corresponding holes 1524 (FIG. 19) of an adjacent ring segment. These pins 1520 help to align the ring segments 1500 around the perimeter of the barrel section 1504.

Figure 20A:
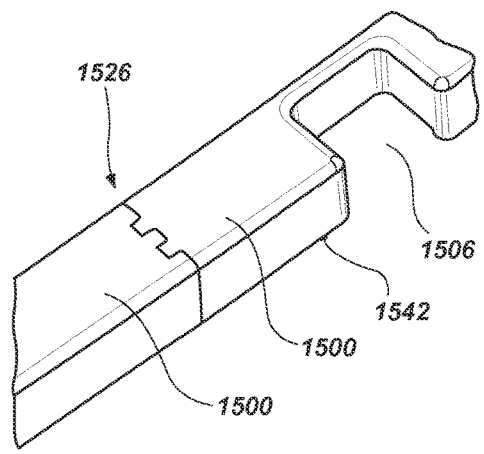
FIG. 20A is a perspective view of another embodiment of interlocking end structure between the joined ends of two stabilizing ring segments in accordance with the present disclosure.
Figure 20B:
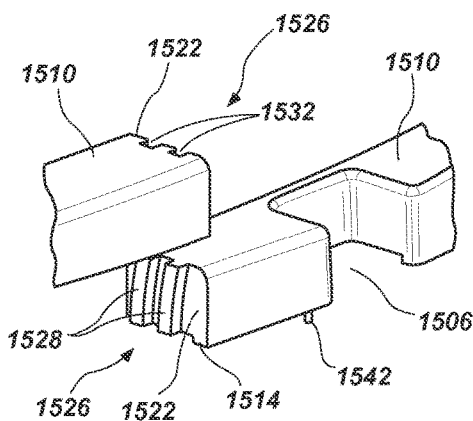
FIG. 20B is a perspective view of the stabilizing ring segments of FIG. 20A, showing the segments disconnected.
Figure 21:
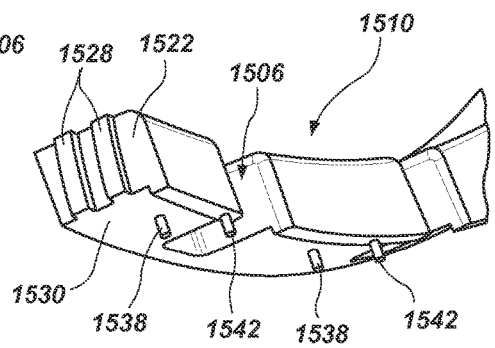
FIG. 21 is a lower perspective view of the end of one of the stabilizing ring segments of FIG. 20A, showing the alignment pins and barrel end shoulder.
Figure 22:
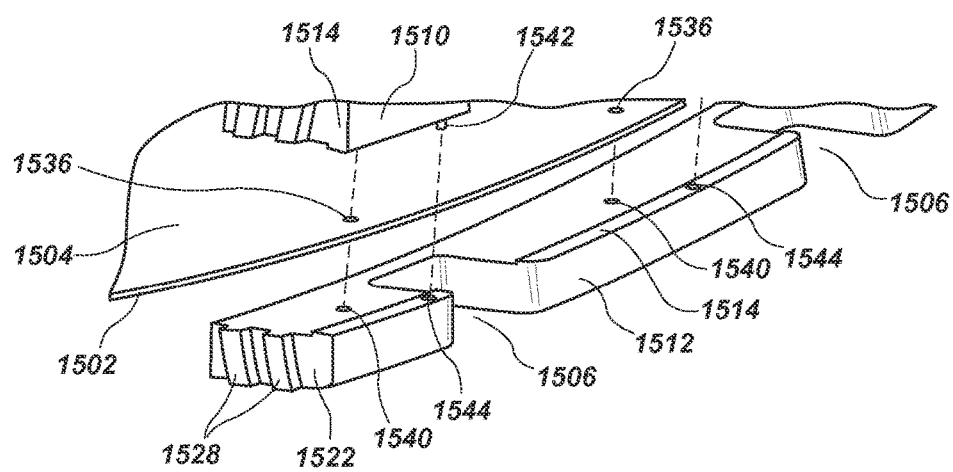
FIG. 22 is an exploded perspective view of a pair of end ring segments adjacent to a barrel end, showing the indexing holes of the barrel section and the alignment pins and holes of the ring segments.

Another type of interlocking structure that both aligns and transmits some degree of mechanical stress between adjacent ring segments is shown in FIGS. 20A and B, and FIG. 21. This interlocking structure 1526 includes protruding ridges 1528 extending from the end 1522 of one ring segment 1500, with corresponding slots 1532 disposed in the opposing face of the end 1522 of the adjacent ring segment 1500. The ridges 1528 slide into the slots 1532 and thus interconnect the longitudinal ends 1530, 1534 of the adjacent ring segments 1500. The ridges 1528 and slots 1532 can take a variety of configurations. In the embodiment of FIGS. 20A, B and 21, the protruding ridges 1528 and the corresponding slots 1532 are oriented at an angle relative to the thickness of the ring segment 1504, and have a curved shape. The curved shape in this embodiment is designed to match a radius path of certain tooling that is designed for automated removal and reattachment of the ring segments and finger clamps, though this configuration can be used regardless of compatibility with any other specific tooling. It is to be appreciated that other configurations of interlocking structure generally and interlocking ridges and slots in particular can also be used. The configuration of FIGS. 20A and B, and FIG. 21 both aligns the ends 1522 of the adjacent ring segments 1500 when they are interlocked, and also transmits some amount of mechanical stress (e.g. compression, tension, bending moment) between adjacent ring segments 1500. The transmission of mechanical stress between adjacent ring segments allows the assembled ring segments to function more like a single solid piece, and thus helps to further preserve the geometry of the barrel section.

Viewing FIGS. 20A, B, 21 and 22, the region near the edge 1502 of the barrel section 1504 can include a series of indexing holes 1536. These indexing holes can be arranged to correspond to positions of indexing pins 1538 that protrude from the internal faces 1530 of one or both of the ring segment halves 1510, 1512. At least some of the indexing pins 1538 fit into the indexing holes 1536 when the ring segment halves 1510, 1512 are attached to the barrel section 1504, and help align the support ring segments 1500 in the proper location around the perimeter of the edge 1502 of the barrel section 1504, and also help maintain consistent shape control of the barrel section within engineering tolerances. The opposing ring segment half 1512 can also include holes 1540 for receiving the indexing pins 1538, so that the pins 1538 which align the ring segments with the barrel 1504 also align the ring segment halves 1510, 1512 with each other.

The opposing ring segment halves 1510, 1512 can also include additional indexing pins 1542 that further align the ring segment halves with each other. These pins 1542 can protrude downwardly from the shoulder portion 1514 of the respective ring segment half, and slide into corresponding holes 1544 in the shoulder portion 1514 of the opposing ring segment half. The combination of the barrel section indexing holes 1536 and ring segment indexing holes 1536, 1544, with the corresponding pins 1538, 1542, helps to facilitate rapid and proper installation of the ring segments 1500, both with respect to each other and with respect to the barrel section 1504. Other indexing holes can be provided in any portion of the barrel section for use in ensuring proper orientation of the barrel section for other purposes, such as on a transport cart 700, as shown in FIG. 8.

Suitable materials for the ring segments 1500 include a variety of materials, depending on the particular application and the shape and configuration of the ring segments. Those of skill in the art will recognize that a suitable material can be chosen through engineering analysis, based on the shape and use of the edge ring, and the stresses to which it will be subject. Suitable materials for edge rings as disclosed herein include steel, aluminum, nanomaterials, hybrid-nanomaterials, composites, hybrid-nano composites and other polymers. Other materials can also be used.

The edge support rings can be configured in various ways. Four different embodiments of end support rings are shown in FIGS. 23-25 and 28-29. As noted above, the end support ring segment 1500 shown in FIGS. 15 and 16 includes a plurality of finger clamp slots 1506, which provide openings for attachment of the finger clamps 1508 to the surface of the barrel section 1504. The segment halves 1510, 1512 can also include indexing pins and end connection pins or ridges, as discussed above. This is referred to herein as a first type of end ring segment, and is shown in a close-up view in FIGS. 23 and 26-27.

Figure 27:
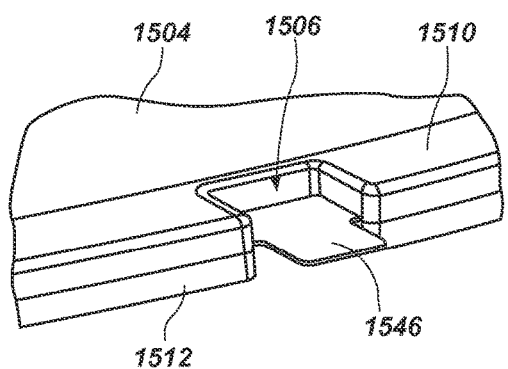
FIG. 27 is a close-up perspective view of a portion of the second type of end support ring installed along a composite barrel edge having edge tabs for gripping by finger clamps.

Another application of the first type of end ring segment 1500 is shown in FIG. 27. In this configuration of the end ring segment 1500 is attached to the end of a barrel section 1504 having finger clamp tabs 1546. This configuration allows excess composite material to extend thru the ring segment 1500 while the ring segment still maintains contour rigidity. The tabs 1546 of this barrel section are designed to provide a larger gripping surface for the finger clamps 1508 (see FIG. 15A), and can be designed to be removed (e.g. sawn or abraded) prior to mating of the barrel section with an adjacent barrel section. Composite sections 1504 with tabs 1546 can be used in situations where the shape of the section is irregular and/or additional clamping strength is needed on the edge of the composite section for finger clamps or the like. Such a situation is shown FIG. 30, where the rear edge 1658 of a barrel segment 1652 is not of a continuously curved circular, oval or elliptical shape, but also includes some flattened sections on its sides. Given this irregular shape, it may be desirable to have tabs that extend from the edges of the composite material, as shown in FIG. 27, and the ring segment 1500 can be used in such a case. Composite sections with edge tabs can be used in other situations as well, and in industries other than aircraft manufacturing.

Figures 23, 24, 25:
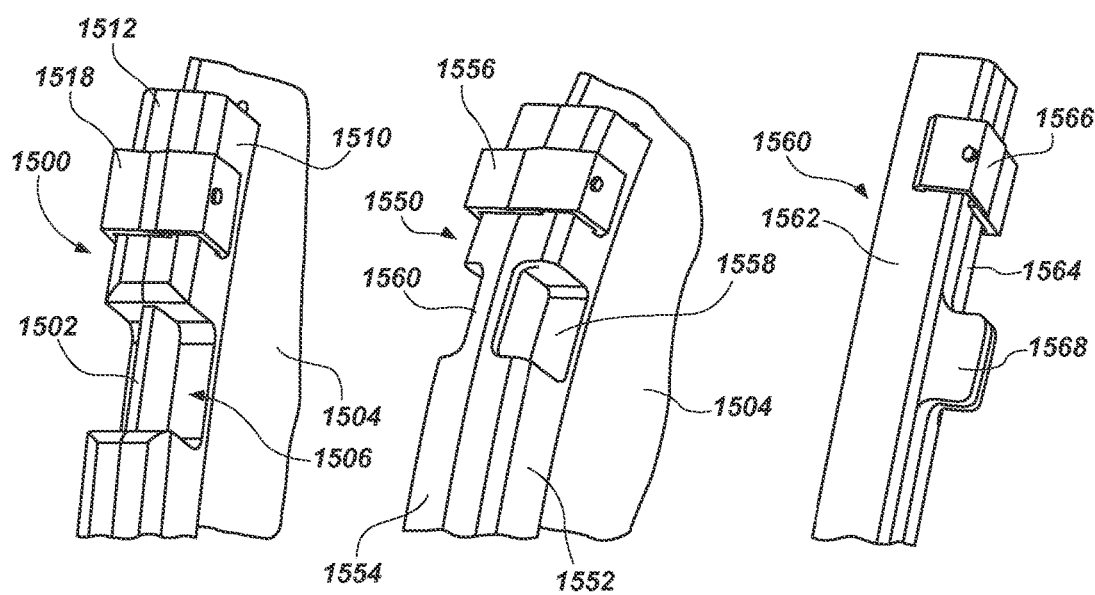
FIG. 23 is a perspective view of a portion of a first type of end support ring segment in accordance with the present disclosure, having an unreinforced cutout for the ring cart finger clamps.
FIG. 24 is a perspective view of a portion of a second type of end support ring segment in accordance with the present disclosure, having a reinforced cutout for the ring cart finger clamps.
FIG. 25 is a perspective view of a portion of a third type of end support ring segment in accordance with the present disclosure, having integral tabs for the ring cart finger clamps.
Figure 26:
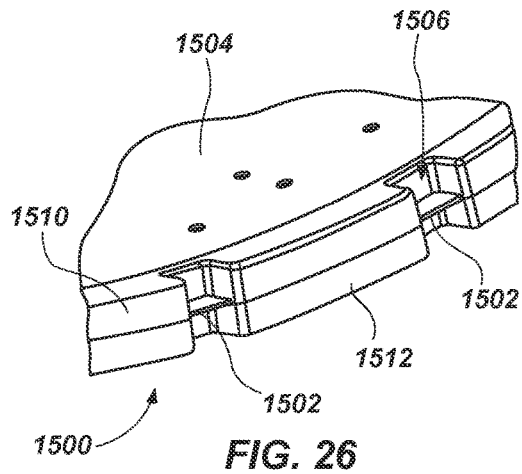
FIG. 26 is a close-up perspective view of a portion of the second type of end support ring installed along a composite barrel edge.

A second type of end ring segment 1550 is shown in FIG. 24. Like the first type of end ring segment 1500 described above, this configuration comprises a pair of segment halves 1552, 1554 that can be attached together and to the end of the barrel section 1504 with a clamp 1556 or other attachment device. The segment halves 1552, 1554 can also include indexing pins and end interlocking structure, as discussed above. This end ring segment includes a finger clamp slot 1558 which is reinforced by a reinforcing bar 1560 composed of portions from each of the halves 1552, 1554 and passes in front of the slot 1558. This configuration provides protection of the contour or shape of the edge of the composite section 1504, while providing a clamping slot 1558 for attachment of clamps or other tooling, and also structurally strengthens the ring segment 1550. In many situations, either the first type 1500 or second type 1550 of end support rings can be used, depending on design and strength requirements.

Shown in FIG. 25 is a perspective view of a portion of a third type of end support ring segment 1560 in accordance with the present disclosure. Again, like the other types of end ring segments described above, this configuration comprises a pair of segment halves 1562, 1564 that can be attached together and to the end of the barrel section with a clamp 1566 or other attachment device. The segment halves can also include indexing pins and end interlocking structure, as discussed above. Advantageously, rather than finger clamp slots, this embodiment is configured to completely enclose the edge 1502 of the respective barrel section 1504, and includes integral tabs 1568 that are composed of portions from each of the halves 1562, 1564 and extend from the edge of the segment 1560 for attachment of the ring cart finger clamps (1508 in FIG. 15A). In this configuration, the ring cart finger clamps 1508 will attach and hold to the end support ring 1560, rather than the barrel section 1504 itself. This can be desirable for situations that may have special design requirements or limited tool access.

Figure 28:
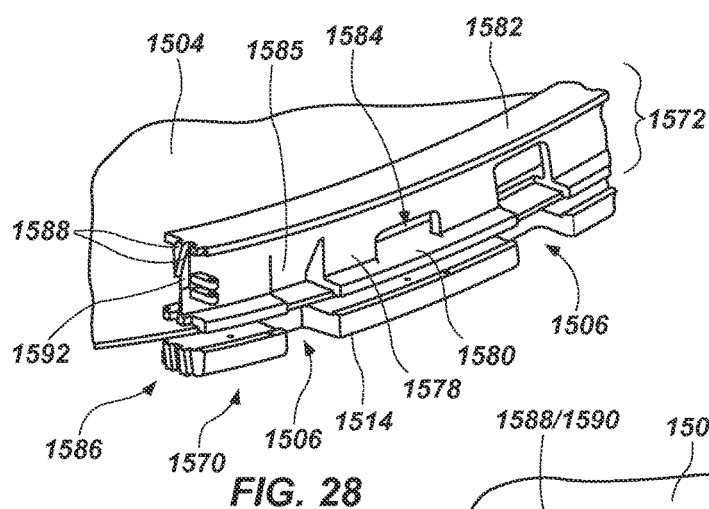
FIG. 28 is a perspective view of a fourth type of end ring segment installed on an edge of a barrel section.
Figure 29:
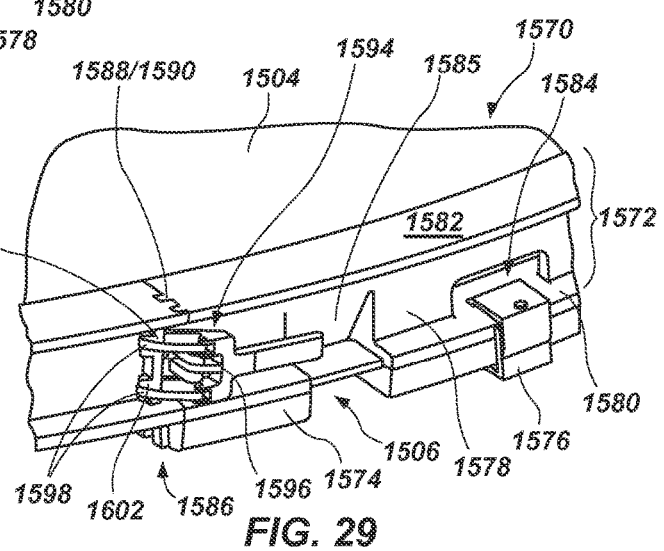
FIG. 29 is a perspective view showing a cam-lock type end connector of the end ring segment of FIG. 28.

A fourth type of end support ring segment 1570 is shown in FIGS. 28 and 29. This end support ring embodiment provides a deeper cross-section for greater shell segment support. Again, like the other types of end ring segments described above, this configuration comprises a pair of segment halves 1572, 1574 that can be attached together and to the end of the barrel section 1504 with a clamp 1576 or other attachment device. The segment halves 1572, 1574 can also include indexing pins for aligning with each other and with indexing holes of the barrel section 1504, and finger clamp slots 1506, as discussed above.

Advantageously, the interior half 1572 of this ring segment 1570 includes an interior web 1578 that extends substantially perpendicularly from the mating flange 1580 of the interior ring segment half 1572, and an interior flange 1582 that is perpendicularly disposed on the interior end of the web 1578. The interior half 1572 of the ring segment 1570 can be integrally formed, so that the mating flange portion 1580, web 1578 and interior flange 1582 comprise a single solid piece having the structural characteristics of an I-beam. The web 1578 and interior flange 1582 together provide additional structural rigidity to this section in a manner similar to the flanges 1820 of the embodiment of FIG. 18. Consequently, the web 1578 and interior flange 1582 together can be viewed as another configuration of an integral reinforcing flange for the ring segment 1570. Periodic web openings 1584 can also be provided in the web 1578 to both reduce weight of the section and also to allow access for tooling. As shown in FIGS. 28 and 29, in some locations, what would otherwise be a web opening 1584 can be filled with a deviated web portion 1585 that jogs around a finger clamp slot 1506 (in this example) so as to provide access for tooling while still providing desired beam strength to the section. The deeper cross-section (i.e. the dimension of the interior half 1572 measured perpendicular to the plane of the barrel section 1504) and beam-type shape of this ring segment 1570 increases the stiffness of the segment, and thus provides more resistance to bending stress around the perimeter of the barrel section 1504.

FIGS. 28 and 29 also show another embodiment of an end interlocking structure 1586 for the ring segment 1570. This end interlocking structure includes interlocking ridges 1588 and slots 1590 in opposing ends 1592 of the interior half 1572 and exterior half 1574 of the ring segment 1570. It will be apparent that the shape and appearance of the ridges 1588 and slots 1590 on the interior half 1572 is affected by the I-beam shape of the interior half.

In addition to the interlocking ridges and slots, this interlocking structure 1586 also includes a cam-lock device 1594 on the interior half 1572 of the ring segment 1570. This cam-lock device 1594 includes a pivoting cam member 1596, a pair of hook members 1598 and a locking bar 1600. After the ridges 1588 and slots 1590 on the ends 1592 of adjacent interior halves 1572 are slid together so that the ends are aligned, the hook members 1598 can be hooked over the locking bar 1600, and the cam member 1596 can be pivoted toward the web 1578 of its respective interior half 1572 to a locked position. The cam member 1596 can be configured with an over-center alignment, so that it is held in the locked position by the stress of the connection. The hook members 1598 can be further secured in place by a connector 1602, such as a nut and bolt or cotter pin, which attaches the distal end of each hook 1598 to the locking bar 1600. The clamping device 1594 has two basic functions. It is designed to both pull the longitudinally adjacent segments 1570 together, and to structurally bridge the variable width gap between the longitudinally adjacent segments.

Interconnection of adjacent ring segments with this cam-lock device 1594 securely attaches the ends of the segments and transmits stress between the adjacent ring segments, such as shear and bending stress, allowing the attached ring segments to function as a single structural unit, while also allowing quick and easy removal when desired. It is to be understood that the cam-lock device 1594 shown in FIGS. 28 and 29 can be configured for use as an end interlocking structure for any of the edge stabilization devices shown herein. It is also to be understood that the cam-lock device 1594 is only one type of end interlocking structure that can be used for this purpose. Other end interlocking devices, such as bolted connections, can also be used for this purpose.

Figure 31:
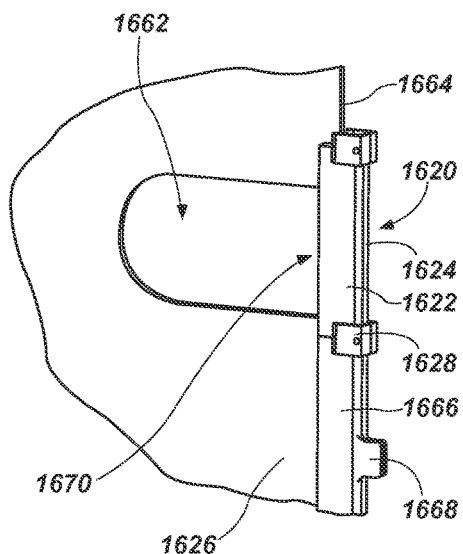
FIG. 31 is a detail view of the third type of end support ring segment used for stabilizing an open-ended cutout in accordance with the present disclosure.

A fifth type of end support ring segment 1620 is shown in FIG. 31. Like the other types of end ring segments described above, this end ring segment 1620 comprises a pair of segment halves 1622, 1624 that can be attached together and to the edge of a piece of composite material 1626 with a clamp 1628 or other attachment device. The segment halves can also include indexing pins and end connection pins or ridges, as discussed above. Unlike the other embodiments discussed above, this embodiment does not include finger clamp slots or integral tabs. Instead, the segment halves 1622, 24 are substantially solid and continuous, and completely enclose and cover the edge of the composite material 1626. This configuration is useful for stabilizing edges of window and door openings, for example, and in locations that are not attached to ring cart finger clamps or the like.

In the various embodiments that are described, the end support ring segments 1500, 1550, 1560, 1570 and 1620 provide continuous structural support for the edge of a composite structure, such as each end of a barrel section 1504. When multiple ring segments are interconnected and attached around an end of a barrel section 1504 in this manner, the complete ring holds the shape of the barrel section at its fore and aft ends.

It is to be understood that the end ring segments 1500, 1550, 1560, 1570 and 1620 should be recognized more broadly as edge stabilizing devices that can be used not only for the ends of composite barrel segments, but also for other portions of composite sections. For example, the various types of end ring segments, and particularly the third type 1560 shown in FIG. 25 and the fifth type 1620 shown in FIGS. 30, 31 and 33, can be used to stabilize door openings, window openings, etc.

Figure 30:
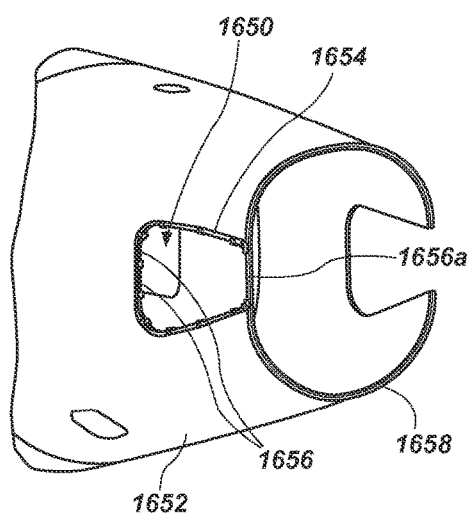
FIG. 30 is a perspective view of a composite barrel section of a tail section of an aircraft, having an open-ended cutout for a horizontal stabilizer.

Shown in FIG. 30 is a view of a horizontal stabilizer opening 1650 in an aircraft barrel section 1652. This is one example of an opening that is provided in the skin of an aircraft, which allows mechanical and structural connections for a horizontal stabilizer to extend from within the tail section of the aircraft fuselage to the stabilizer itself. When the fuselage section 1652 that includes this opening 1650 is first removed from its associated mandrel, stabilization of the edge 1654 of the opening 1650 can be desirable to maintain its shape within desired tolerances. This allows the edge stabilization devices to secure the edges of the composite shape during assembly and installation. The edge stabilization devices can be applied to fuselage sections, tubes, doors, windows and areas where adjacent composite sections are to be joined, and can work with composites, nanomaterials, polymers, hybrid materials and other materials in a wide variety of industries.

As shown in FIG. 30, a plurality of edge stabilizer segments 1656 are attached around the interior edge 1654 of the opening 1650 of this barrel section 1652 and affixed with clamps in the manner discussed above. Since the interior edge of this opening is not a barrel end that is to be attached to an assembly ring cart via finger clamps, these edge stabilization devices 1656 are generally configured like the fifth type 1620 of edge stabilization device discussed above, and do not include finger clamp slots or tabs. However, it can be seen that the horizontal stabilizer opening 1650 extends to the rear edge 1658 of this barrel segment 1652. Consequently, an edge stabilizer segment 1656a is provided which extends across the open end of the stabilizer opening 1650. This edge stabilizer segment 1656a helps to maintain the geometry of the opening 1650 (e.g. width of the opening and alignment of opposing sides of the opening) until the adjacent barrel section and/or other stiffening structure is attached around it.

A more generic depiction of a composite panel 1626 with an opening 1662 that can include edge stabilization in this manner is shown in FIG. 31. In this view, the composite panel 1626 includes an opening 1662 that extends to the edge 1664 of the material. Away from the free end or mouth 1670 of the opening 1662, this edge is stabilized using an edge stabilizer device 1666 that is like the third type 1560 of end ring segment shown in FIG. 25. This edge stabilizer 1666 includes an integral tab 1668 that can be gripped by a finger clamp or other structure. Bridging across the free end or mouth 1670 of the opening is a segment of the fifth type of edge stabilizer 1620. This segment is continuous and bridges the mouth 1670 of the opening 1662, and does not include finger clamp slots or edge tabs. As described above, this edge stabilizer bridge segment can be attached by clamps 1628 and can comprise two halves with recessed shoulders that combine to form a slot to grip the edge of the composite material, in the manner discussed above. The slot can be discontinuous to bear against the opposing inner edges of the opening 1662, as well as against the end 1664 of the composite panel 1626, in order to maintain the width and alignment of the mouth 1670 of the opening 1662. The longitudinal ends of the edge stabilizer bridge segment and the adjacent edge stabilizer segments can also include interlocking structure, as described above, to align the edge stabilizer segments and provide for transmission of mechanical stress, to allow the group of edge stabilizers to function as a single structural unit.

Figure 32:
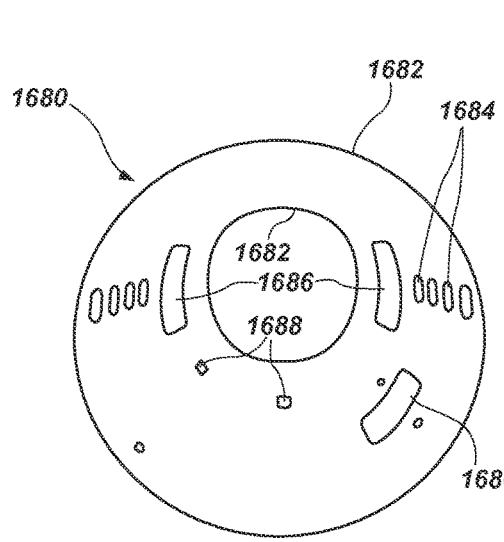
FIG. 32 is a perspective end view of a composite barrel section for an aircraft, showing various types of openings that can be stabilized using an edge stabilizing device in accordance with the present disclosure.
Figure 33:
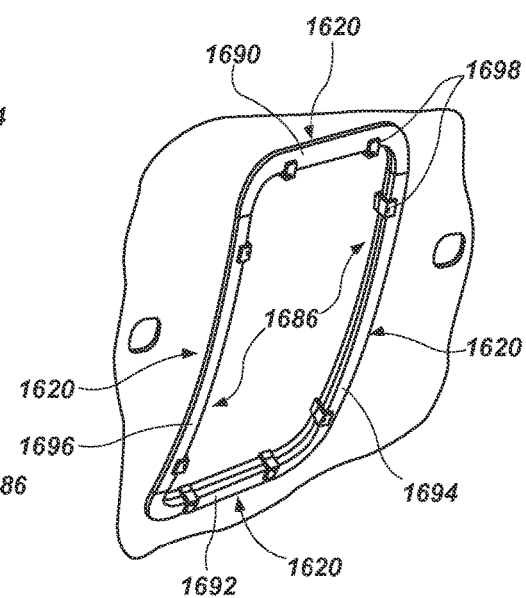
FIG. 33 is a perspective view of a door opening in an aircraft composite barrel section, the opening being stabilized using an edge stabilizing device in accordance with the present disclosure.

A variety of types of openings can be stabilized in the manner shown in the figures. Shown in FIG. 32 is a perspective end view of a composite barrel section 1680 for an aircraft. In addition to the ends 1682 of the barrel section, this barrel section 1680 includes window openings 1684, door openings 1686, and utility or service openings 1688 that can all be stabilized and reinforced using the edge stabilizing devices disclosed herein. For example, shown in FIG. 33 is a close-up view of a door opening 1686 that is stabilized using the fifth type 1620 of edge stabilizing device in accordance with the present disclosure. This edge stabilizing device includes an upper segment 1690, a lower segment 1692, and two side segments 1694, 1696, each of which include opposing halves that attach to the edge of the door opening and are affixed with clamps 1698, in the manner discussed above. Since the interior edge of this door opening is not a barrel end that is to be attached to an assembly ring cart via finger clamps, the edge stabilizer segments 1690-96 in this embodiment do not include finger clamp slots or tabs or other comparable structure. Instead, these stabilizer segments are substantially continuous and provide solid support around the perimeter of the door opening 1686.

Figure 34:
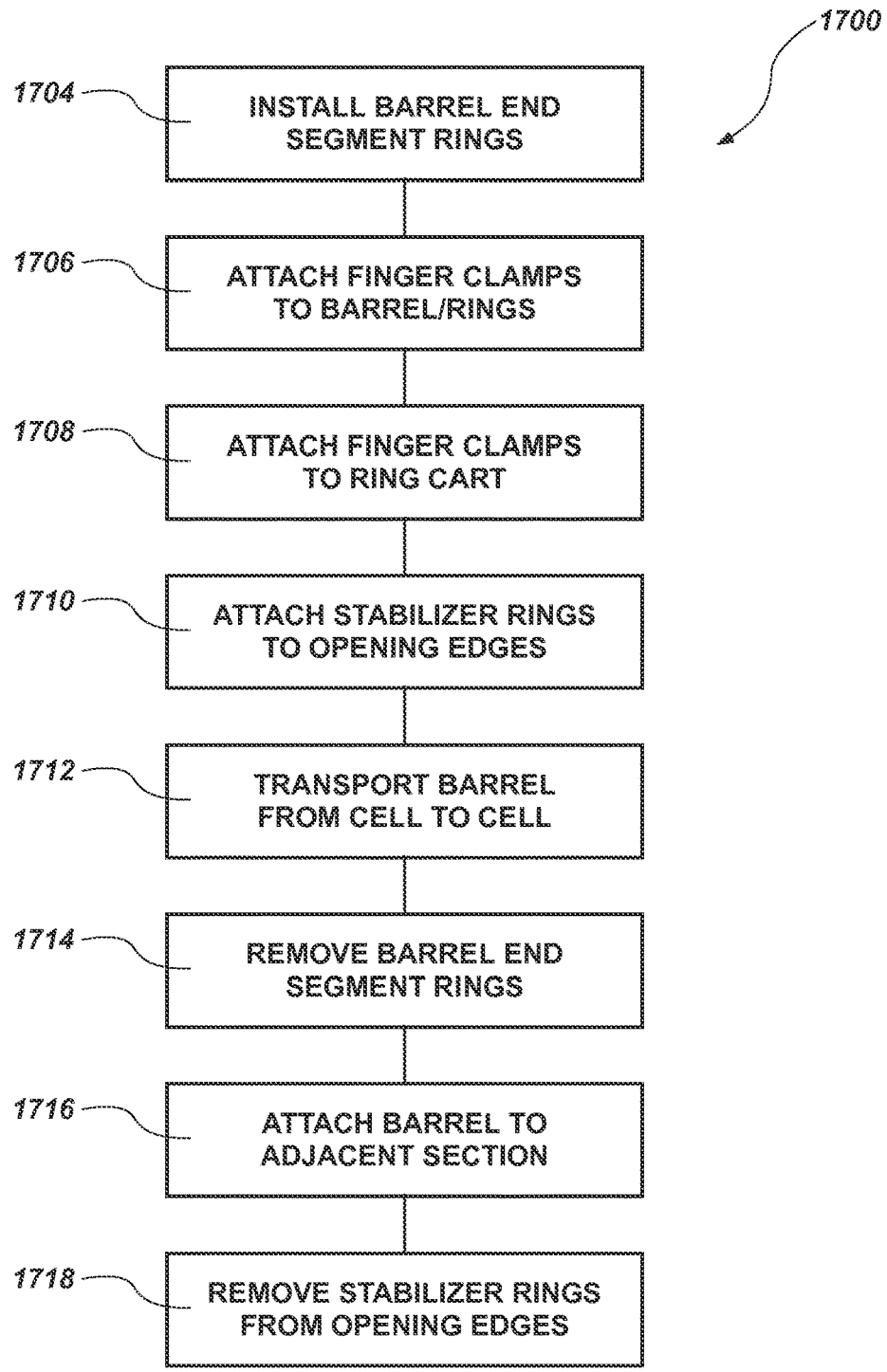
FIG. 34 is a flow chart outlining one embodiment of a method for edge stabilization of a composite barrel section in preparation for subsequent assembly processes.

One method 1700 for edge stabilization using the apparatus disclosed herein is outlined in the flow chart of FIG. 34. The steps outlined in this embodiment of the method apply to edge stabilization for the assembly process, and it is to be understood that the order of the steps shown can vary from the order shown in the figure. As each mandrel is removed from the barrel section following its fabrication and curing, the first step is to install the barrel end segment rings (step 1704). Then the finger clamps can be attached to the barrel section end (or to the stabilizer ring segments at the end) (step 1706), and to the assembly cart (FIGS. 14A, B) (step 1708), thus attaching the barrel section to the assembly cart. Edge stabilizer segments can also be attached to the edges of other openings (step 1710), such as for doors, windows, access hatches and other openings (e.g. horizontal stabilizer area, etc.).

With the barrel section attached to the ring cart, it can then be transported from cell to cell (step 1712) throughout the assembly process, which allows the barrel to be axially rotated as desired for various assembly operations. Throughout this process, the end support rings and edge stabilizer rings for various openings stabilize and maintain the geometry of the barrel section to within desired tolerances, thus enhancing the speed and quality of assembly, and reducing rework and the like.

At some point in the assembly process the barrel section can be removed from the assembly cart prior to attachment to an adjacent barrel section. The point at which it is considered desirable and appropriate to remove the barrel section from the assembly cart and to remove edge stabilization devices can depend on a variety of factors. For example, once sufficient internal structural members are installed in a given barrel section, the barrel section as a unit may be sufficiently strong to resist deformation without additional stabilization. Consequently, at or after such a point the end support rings can be removed (step 1714). The barrel section can thereafter be attached to an adjacent barrel section (step 1716). Similarly, after sufficient supporting structure is installed around window openings, door openings, etc., associated edge stabilization devices can then be removed (step 1718).

Advantageously, edge stabilizer segments, whether for the ends of barrel sections or in other locations, can be removed and replaced as needed for various operations or inspection. For example, sanding on an internal surface of a barrel section in preparation for joining the section to an adjacent section can be desired in some circumstances. In such a case, where a given edge stabilizer segment is in the way, that segment can be removed temporarily, the work or inspection can be completed, and the segment can be reinstalled.

Figure 35:
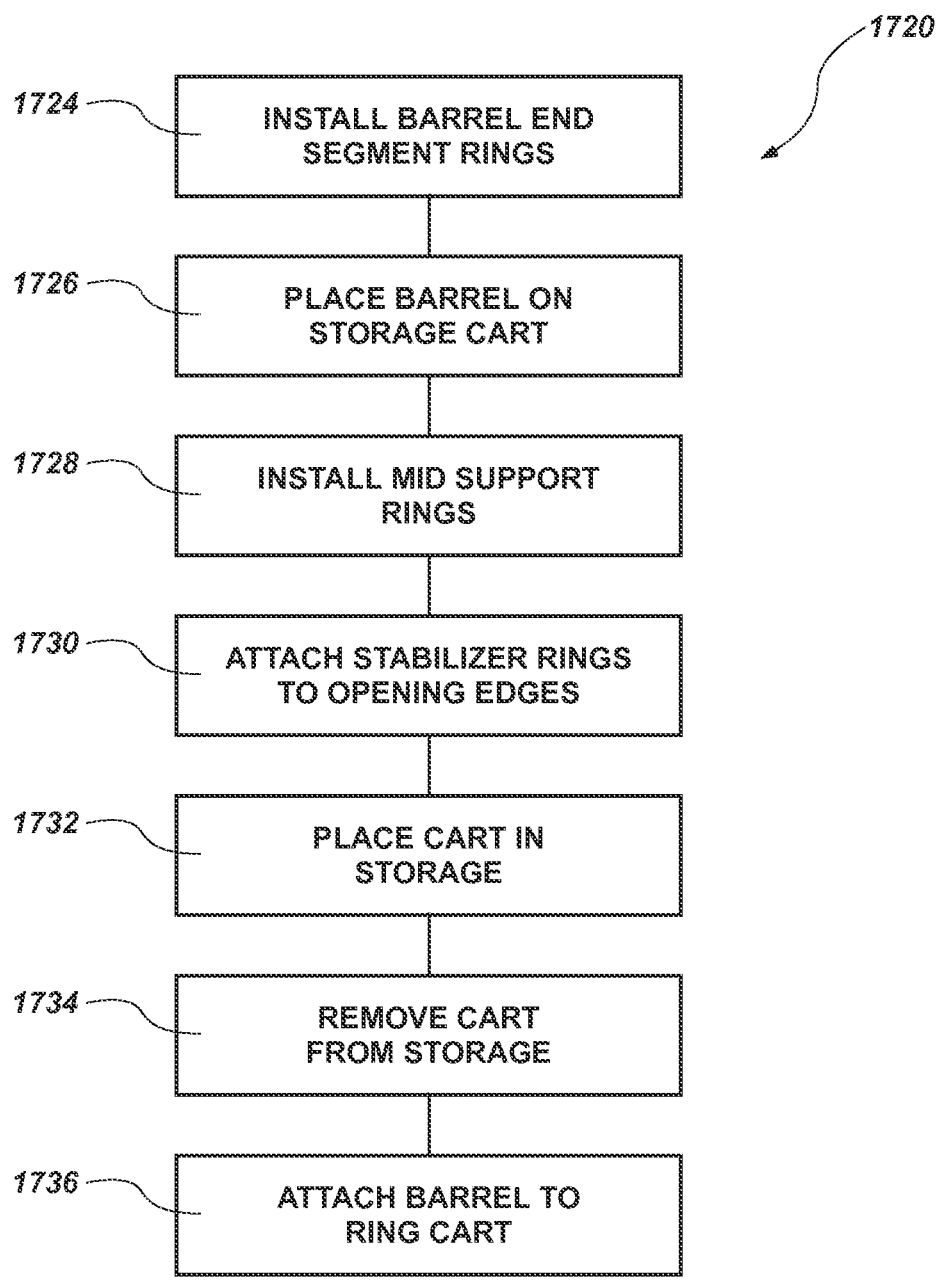
FIG. 35 is a flow chart outlining one embodiment of a method for edge stabilization of a composite barrel section in preparation of a composite section for storage.

One embodiment of a process 1720 for edge and internal stabilization of composite barrel sections for storage purposes using the apparatus disclosed herein is outlined in FIG. 35. As discussed above, FIGS. 3-10 show a barrel section transport and support system that provides spoked end rings 120 and internal spoked rings 140 for supporting a barrel section, and a cart 700 for supporting and transporting the barrel section. The end support rings 1500 and other edge stabilizer devices shown in FIGS. 15-33 can also be used for these purposes, and these structures or can be used in any desired combination for storage of the barrel section.

As with the method outlined in FIG. 34, the first step after each mandrel is removed from the barrel section is to install the end shell segment rings (step 1724). These can be spoked or unspoked rings. If desired, assembly cart finger clamps can then be attached to the end shell segment ring (or to the end of the barrel section) in the manner discussed above and shown in FIG. 15A, but this is optional for storage purposes. End support rings that do not provide for assembly cart clamps, such as those shown in FIGS. 3-6 and 8-10 can also be used in this method, in the manner discussed above.

The barrel section can then be moved to base supports on a storage cart (step 1726) like the cart shown in FIGS. 8-10, or the finger clamps, if used, can be attached to an assembly cart like that shown in FIGS. 14A and B. In preparation for storage it can also be desirable to install mid support rings (step 1728), like the mid support rings 140 shown in FIGS. 4-10, for barrel shape control. Edge stabilizer segments can also be attached to the edges of other openings (step 1730), such as for doors, windows, access hatches and other openings (e.g. horizontal stabilizer area, etc.), as discussed above.

The cart carrying the barrel section can then be placed in storage (step 1732) until the stored barrel section is desired for additional operations. At that point, the cart is removed from storage (step 1734), at which point the barrel section can be attached to a ring cart (step 1736) if it is not already on a ring cart. At this point the barrel section will be ready for additional assembly and manufacturing operations.

Advantageously, the system and method disclosed herein helps hold a composite barrel within engineering tolerances without a floor grid installation, and allows the barrel to be moved from cell to cell and position to position. This system and method helps maintain the shape of the barrel within engineering tolerances from cell to cell and during storage. The various end ring and edge stabilizer configurations shown and described herein can be used to support assembly and installation of internal assemblies within a composite barrel section from the point removal of the mandrel tool up to the point of joining the barrel to an adjacent barrel section. The end ring and edge stabilizer devices can be kept in place during transport between cell to cell in an assembly operation, and also during storage. The system and method disclosed herein allows for repeatable conditions for maintaining the internal mold line shape of a composite barrel within engineering tolerances using a 3-datum control, which helps to maintain the barrel shape during the assembly process. The cart assembly combined with shape rings and internal barrel supports also helps reduce preload stresses in frames and other structures that are attached to the barrel section during assembly. It is believed that this approach can improve the quality of joints between barrels and facilitate the installation of barrel interface assemblies. It is believed that this approach has the potential to significantly reduce assembly time by reducing rework, and can also promote worker safety.

The edge stabilization system and method disclosed herein helps to improve the quality of installation of frames and other barrel interface assemblies, and ultimately helps improve the quality of joints between one barrel section and the next. Advantageously, the end support rings and related structure shown in FIGS. 15-30 can help accomplish these objectives without the use of end support rings having wheel spokes. The apparatus and methods disclosed herein can also reduce labor and cost for production by avoiding or significantly reducing rework.

The end support rings disclosed herein offer several different designs that provide continuous structural end support between clamps for mounting of a barrel section on an assembly ring cart. Various embodiments of the edge stabilizer devices include design features that meet specific design requirements, such as for aircraft doors, horizontal stabilizers, windows, etc., and provide adjustment capabilities. Mid support rings that are connected together can also be used in combination with other embodiments to provide support to the barrel during storage. The system and method disclosed herein thus addresses a specific need to provide support of composite barrel sections for storage, transportation, and subsequent barrel rotations as part of manufacturing operations. While the apparatus and methods disclosed herein are presented in the context of composite barrel sections, it is to be understood that they can be applied to panels or structures made from a wide range of materials, such as carbon steel, titanium, aluminum, carbon fiber reinforced polymer, carbon nanotube polymer, composite, nanohybrid composite, nanomaterial and hybrid material applications, to name just a few. Additionally, while aircraft applications are particularly shown and described, it is to be understood that the edge stabilizing system and method disclosed herein can be applied in a wide range of industries, such as defense, space, aerospace, aviation, automotive, transportation, sports, medical, architectural, civil, manufacturing, electrical, telecommunications, high-tech, energy, entertainment, marine and ship building. Additional applications might include exotic design outside of the aforementioned industries, such as nanotechnologies, robotic, biotechnology, and biomedical design.

It is to be understood that the above-referenced arrangements are illustrative of the application of the principles of the present invention. It will be apparent to those of ordinary skill in the art that numerous modifications can be made without departing from the principles and concepts of the invention as set forth in the claims.

What is claimed is:

1. An edge stabilizer for a composite structure, comprising:
    an elongate edge support segment, defining a geometric shape of an edge of the composite structure, comprising separable first and second halves configured to attach together around the edge, each half including a shoulder, opposing mating relationship of the shoulders defining a slot for receiving the edge; and
    a connector, configured to attach the edge support segment to the edge of the composite structure, wherein the connector is a clamp that fits over an outer edge of each of the first and second halves of the elongate edge support segment and wherein at least one of the halves includes indexing pins, configured to insert into indexing holes disposed near the edge of the composite structure.

2. An edge stabilizer in accordance with claim 1, wherein the slot has a thickness that is less than a thickness of the composite structure.

3. An edge stabilizer in accordance with claim 1, wherein at least one of the first and second halves further comprise an integral flange, extending substantially perpendicularly with respect to the composite structure.

4. An edge stabilizer in accordance with claim 1, wherein the edge support segment includes cutout portions in which the edge of the composite structure is exposed.

5. An edge stabilizer in accordance with claim 4, wherein the cutout portions each have a front, and further comprising a reinforcing bar, disposed across the front.

6. An edge stabilizer in accordance with claim 1, wherein the edge support segment includes a tab extending therefrom, substantially in a plane of the composite structure.

7. An edge stabilizer in accordance with claim 1, wherein the edge support segment is configured to bridge across an end of an opening in the composite structure.

8. An edge stabilizer in accordance with claim 1, wherein the elongate edge support segment further comprises interlocking structure at longitudinal ends thereof, the interlocking structure configured to attach a plurality of elongate edge support segments end-to-end in series.

9. An edge stabilizer in accordance with claim 1, wherein the elongate edge support segment defines about one sixth of a circle.

10. The edge stabilizer of claim 1, wherein the slot defined by the opposing mating relationship of the shoulders is between the shoulders.

11. The edge stabilizer of claim 1, wherein the clamp further comprises a two-part clamp.

12. The edge stabilizer of claim 4, wherein the cutout portions are configured to receive the clamp.

13. A system for stabilizing edges of a composite barrel section, comprising:
    a plurality of elongate edge support segments, defining a geometric shape of an edge of the composite barrel section, comprising first and second halves, the halves configured to attach together around the edge, each half including a shoulder, opposing mating relationship of the shoulders defining a slot for receiving the edge;
    a connector, configured to attach the edge support segment to the edge, wherein the connector is a clamp that fits over an outer edge of each of the first and second halves of the elongate edge support segment; and
    a moveable cart, the barrel section being supportable upon the cart.

14. A system in accordance with claim 13, wherein at least one of the first and second halves further comprise an integral flange, extending substantially perpendicularly with respect to the barrel section.

15. A system in accordance with claim 13, wherein the plurality of elongate edge support segments comprise interlocking structure at longitudinal ends thereof, the interlocking structure configured to attach a plurality of elongate edge support segments end-to-end in series.

16. A system in accordance with claim 13, wherein the plurality of elongate edge support segments include one of cutout portions in which the edge of the composite barrel section is exposed, and an integral tab extending therefrom, configured for mechanical gripping.

17. A system in accordance with claim 13, wherein the edge support segment is configured to bridge across an end of an opening in the composite barrel section.

18. The system of claim 13, wherein the slot defined by the opposing mating relationship of the shoulders is between the shoulders.

19. The system of claim 13, wherein the clamp further comprises a two-part clamp.

20. The system of claim 13, further comprising a pair of pins, each pin extends from a longitudinal end of the first and second halves of the elongate edge support segment.

21. The system of claim 20, wherein the pair of pins are configured to insert into corresponding holes in an adjacent elongate edge support segment.

22. The system of claim 13, wherein the slot further comprises a U-shaped slot.

23. The system of claim 13, wherein the first and second halves of the elongate edge support segment each further comprise at least one clamp slot.

24. An edge stabilizer, for a composite structure, comprising:
    an elongate edge support segment, defining a geometric shape of an edge of the composite structure, comprising separable first and second halves configured to attach together around the edge, each half including a shoulder, opposing mating relationship of the shoulders defining a slot for receiving the edge; and
    a connector, configured to attach the edge support segment to the edge of the composite structure, wherein the connector is a clamp that fits over an outer edge of each of the first and second halves of the elongate edge support segment and wherein the slot further comprises a U-shaped slot.

25. The edge stabilizer of claim 24, further comprising a pair of pins, each pin extends from a longitudinal end of the first and second halves of the elongate edge support segment.

26. The edge stabilizer of claim 25, wherein the pair of pins are configured to insert into corresponding holes in an adjacent elongate support segment.

* * * * *